United States Patent [19]

Cray

[11] 3,833,889

[45] Sept. 3, 1974

[54] MULTI-MODE DATA PROCESSING SYSTEM

[75] Inventor: Seymour R. Cray, Chippewa Falls, Wis.

[73] Assignee: Control Data Corporation, Minneapolis, Minn.

[22] Filed: Mar. 8, 1973

[21] Appl. No.: 339,237

[52] U.S. Cl. .............................................. 340/172.5
[51] Int. Cl. ........................... G06f 9/20, G06f 15/16
[58] Field of Search ....................... 340/172.5; 444/1

[56] References Cited

UNITED STATES PATENTS

| | | | |
|---|---|---|---|
| 3,234,519 | 2/1966 | Scholten | 340/172.5 |
| 3,239,816 | 3/1966 | Breslin et al. | 340/172.5 |
| 3,245,047 | 4/1966 | Blaauw et al. | 340/172.5 |
| 3,544,965 | 12/1970 | Packard | 340/172.5 |
| 3,735,360 | 5/1973 | Anderson et al. | 340/172.5 |
| R26,171 | 3/1967 | Falkoff | 340/172.5 |

*Primary Examiner*—Gareth D. Shaw
*Assistant Examiner*—John P. Vandenburg
*Attorney, Agent, or Firm*—Robert M. Angus

[57] ABSTRACT

A computer system according to the present disclosure includes a plurality of individual processors and an interlock register connected to the processors for process control independent of memory. One aspect of the disclosure resides in a "universal" register technique and apparatus wherein the main registers of each processor are selectively operated in a plurality of modes. Another aspect of the disclosure resides in an addressing technique and apparatus wherein a reference address of an object program is selectively added to addresses of programs inside and outside of the field length of the object program to obtain the absolute address of the program. Absolute addresses of resident programs, however, are handled by not adding the reference address to the resident program address.

73 Claims, 13 Drawing Figures

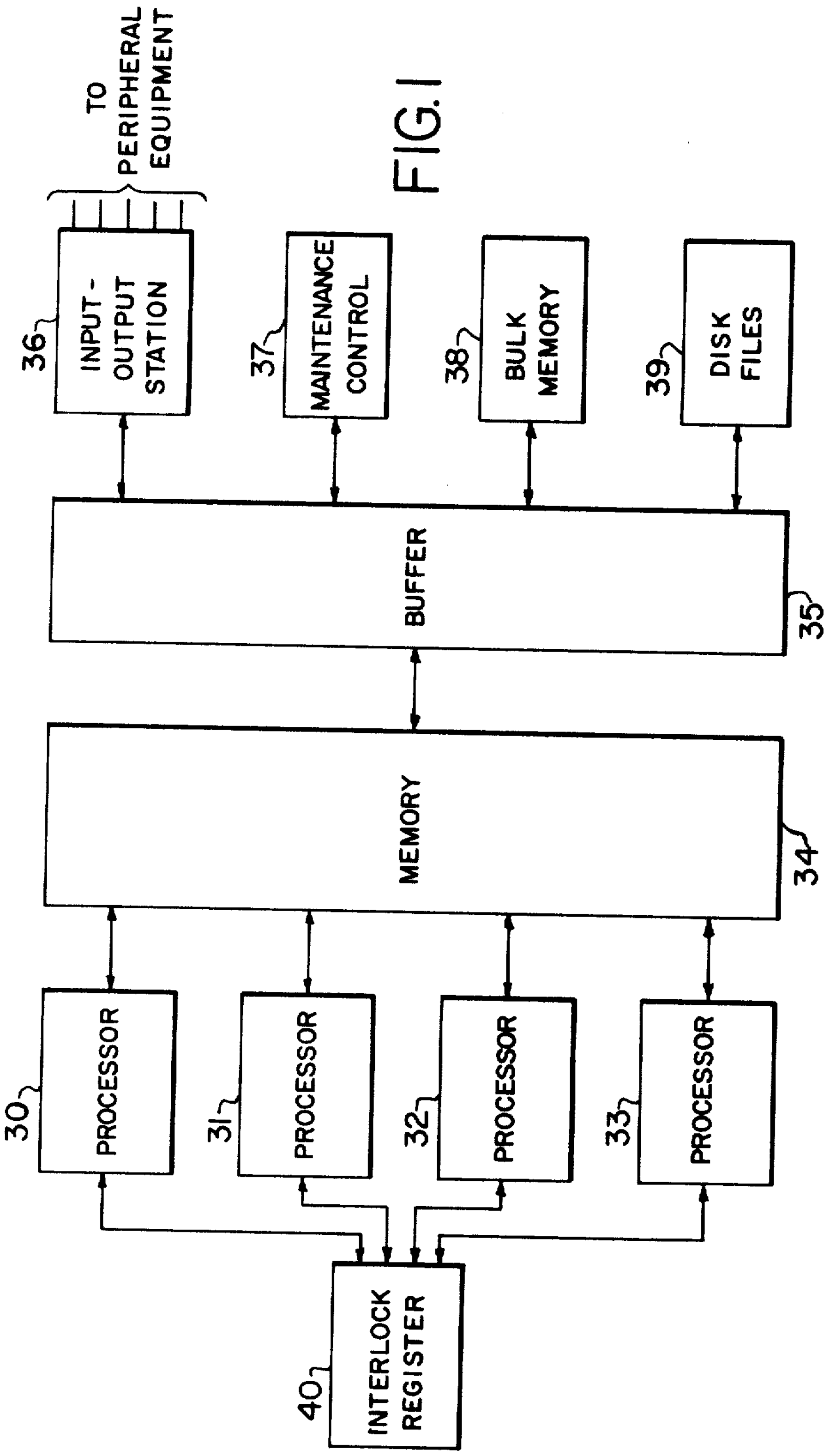
FIG. I

MULTI-MODE DATA PROCESSING SYSTEM

This invention relates to computer systems, and particularly to a multi-processor computer system utilizing an interlock control between the several processors for controlling independent processing operations of each respective processor. Additional aspects of the present invention reside in the provision of universal registers capable of being used as index, program address, and arithmetic or operand registers, and in the provision of an addressing technique useful for exchange jumps, program operation and library access.

Multi-processor computer systems are characterized by the inclusion of a plurality of individual processors connected to a common memory. Heretofore, delegation of processing operations, inter-processor controls, and inter-processor data transmission have been accomplished by selectively controlling the common memory to forward data to and between the individual processors for operation thereby. Although such multi-processor computer systems have been successful, inherent limitations have been imposed on such systems by virtue of the considerable amount of time devoted to acquiring delegation and processing instructions from the memory, and because the processed data intended for communication between individual processors must be routed through the memory.

Heretofore computer processors have ordinarily included a plurality of individual register sets, a first set of which are hardwired for program address purposes, a second set of which are hardwired for program address purposes, and yet another set of which are hardwired as accumulators for arithmetic operations. Therefore, an individual processor might include as many as twenty-four registers, eight for indexing, program addressing, and accumulation purposes. Thus, only eight registers were available for each operation. Ordinarily, the registers of each type are sized in accordance with the requirements of each individual operation. Thus, the index registers have one capacity, the address registers another capacity, and the accumulation registers yet another capacity.

It is an object of the present invention to provide a processor having a plurality of registers which are selectively operated through merge and distribution networks to accomplish indexing, program addressing, and accumulating operations, depending upon the manner of operation of the merge and distribution networks. Thus, with "universal" registers in accordance with this aspect of the present invention the total number of registers may be reduced, and yet more registers are available for any individual function.

It is yet another object of the present invention to provide a control network for selectively gating a plurality of registers for operation in accordance with a selected one of a plurality of desirable operations.

It is yet another object of the present invention to provide a multi-processor computer system having a plurality of individual processors connected to a common memory wherein interlock control mean is provided to delegate processing operations to the individual processors without requiring delegation information to be provided by the memory.

Another object of the present invention is to provide a multi-processor computer system wherein data to be forwarded between individual processors is routed through a common interlock control, rather than through a common memory.

Another problem associated with prior processors resides in the fact that addresses associated with a particular object program bore some relationship to the physical arrangement of the memory, and in order to effectuate jumps or calls to program (object and/or resident) outside of the field length of the particular object program, the absolute address of the program being called or jumped to first had to be retrieved from memory. Thus, upon return to the original object program, the absolute address of that program had to be also retrieved from memory.

Accordingly, it is yet another object of the present invention to provide a processor having memory access controls which contain a reference address of the operating object program, the controls being selectively gated to access the memory at an absolute address (such as might be associated with a resident library routine), or the reference address (such as when operating in the field of the object program), or to a modified address to affectuate jumps to programs outside of the field of the object program.

In accordance with the present invention, a plurality of processors are individually connected to a common memory as well as to an interlock control means. The interlock control means delegates processing operation to the individual processors. All input/output control, maintenance control, bulk memory and disc files are connected to the memory.

In accordance with one feature of the present invention, a computer processor is provided having a plurality of individual registers having, as their common input, a merge network, and having, as their common output, a distribution network. At least one output from the distribution network is connected to memory, and at least two other outputs of the distribution network is provided to the merge networks. A program controller is provided for controlling access to the registers through the merge networks and for controlling selection of the distribution networks in accordance with predetermined instructions so that the registers may be selectively operated as index registers, program address registers, arithmetic or accumulator registers, or any combination thereof.

Yet another feature of the present invention resides in a memory access control for a processor wherein a reference address relating to an object program is stored, the control having a register for storing an exchange address and a register for storing a program address. A gate is provided for selectively gating a memory either the exchange address (as incremented through suitable increment circuits) or the program address combined with the reference address, the program address being incremented for successive addresses.

The above and other features of this invention will be more fully understood from the following detailed description and the accompanying drawings, in which:

FIG. 1 is a block diagram of a multi-processor computer system in accordance with the presently preferred embodiment of the present invention;

FIGS. 2A, 2B and 2C, when edge matched as shown in FIG. 2D, form a block diagram of the register and control portions of an individual processor;

DETAILED DESCRIPTION

Figure 2A:
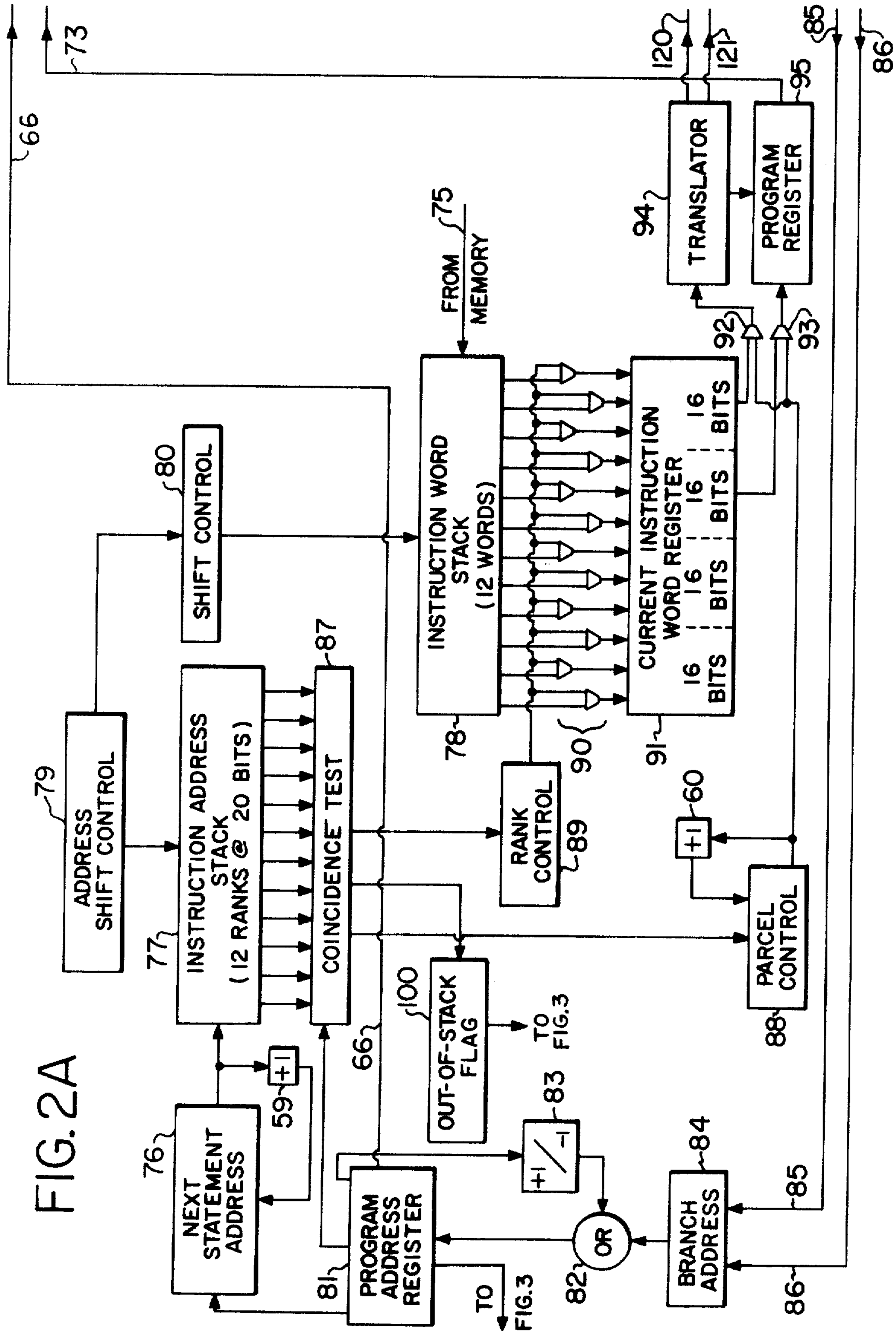

With reference to FIG. 1, there is illustrated a multiprocessor computer system in accordance with the presently preferred embodiment of the present invention. The computer system includes a plurality of individual processors, 30, 31, 32, 33 connected to a common memory 34. For example, memory 34 may be a 256K-word memory, each word having 64 bits. The memory is connected through buffer 35 to an input-/output station 36, maintenance controller 37, bulk memory 38 and disc files 39. Input/output station 36 is preferably connected to suitable peripheral equipment such as card readers, tape drives, optical readers, readout devices, and other suitable peripheral equipment well known in the art. The input/output station, together with such peripheral equipment as may accompany it, provides the necessary raw data input and data output for processors 30–33. Of course in large scale operations, the input/output station may itself be a smaller computer. Interlock register 40 is connected to each processor 30–33. It is to be understood that although four processors are illustrated in FIG. 1, there may be any number of processors, and that four are shown for purposes of explanation and not of limitation. Further, although bulk memory 38 and disc files 39 are shown connected to buffer 35, it is to be understood that in some circumstances they may be omitted.

Figure 2B:
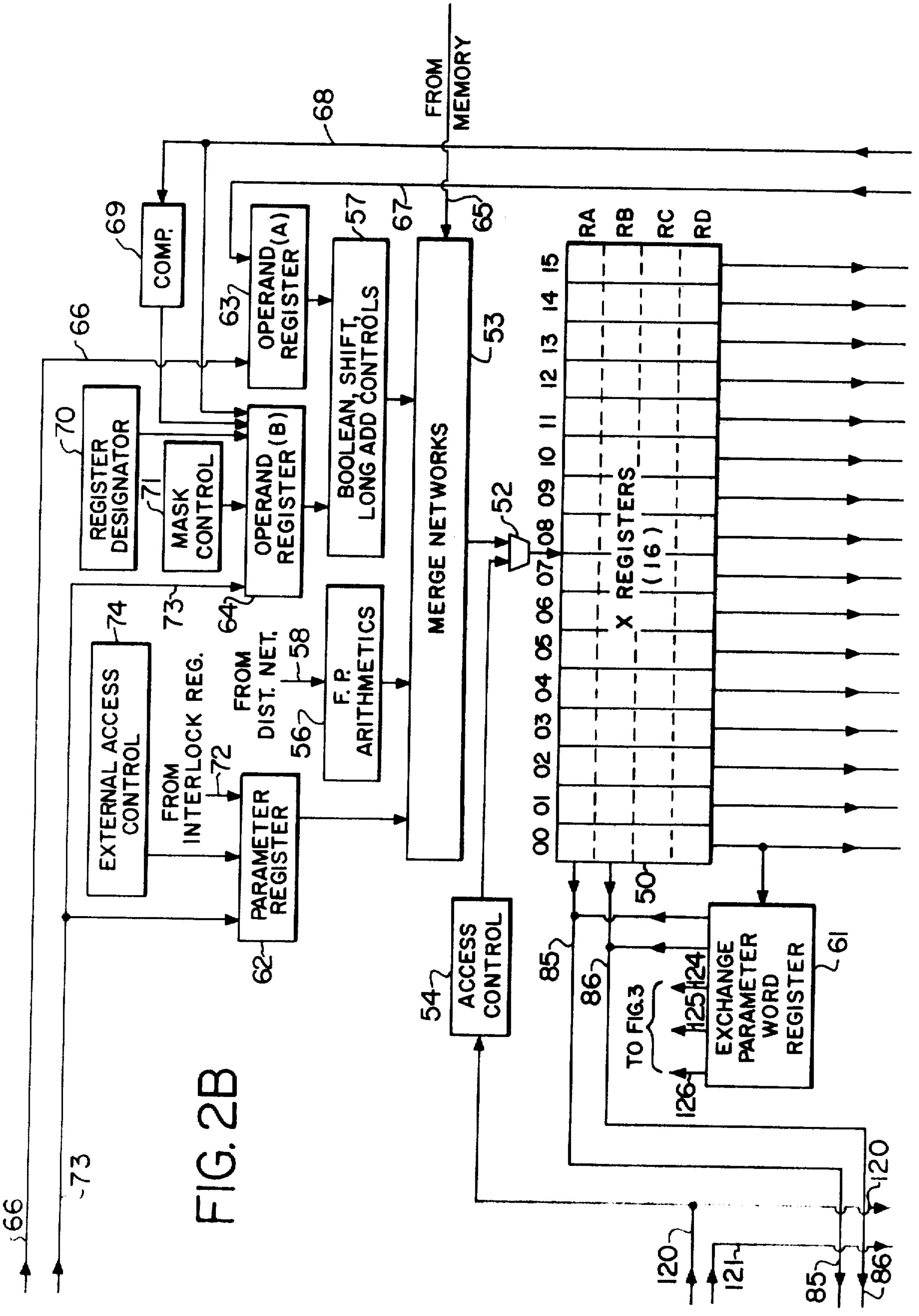
Figure 2C:
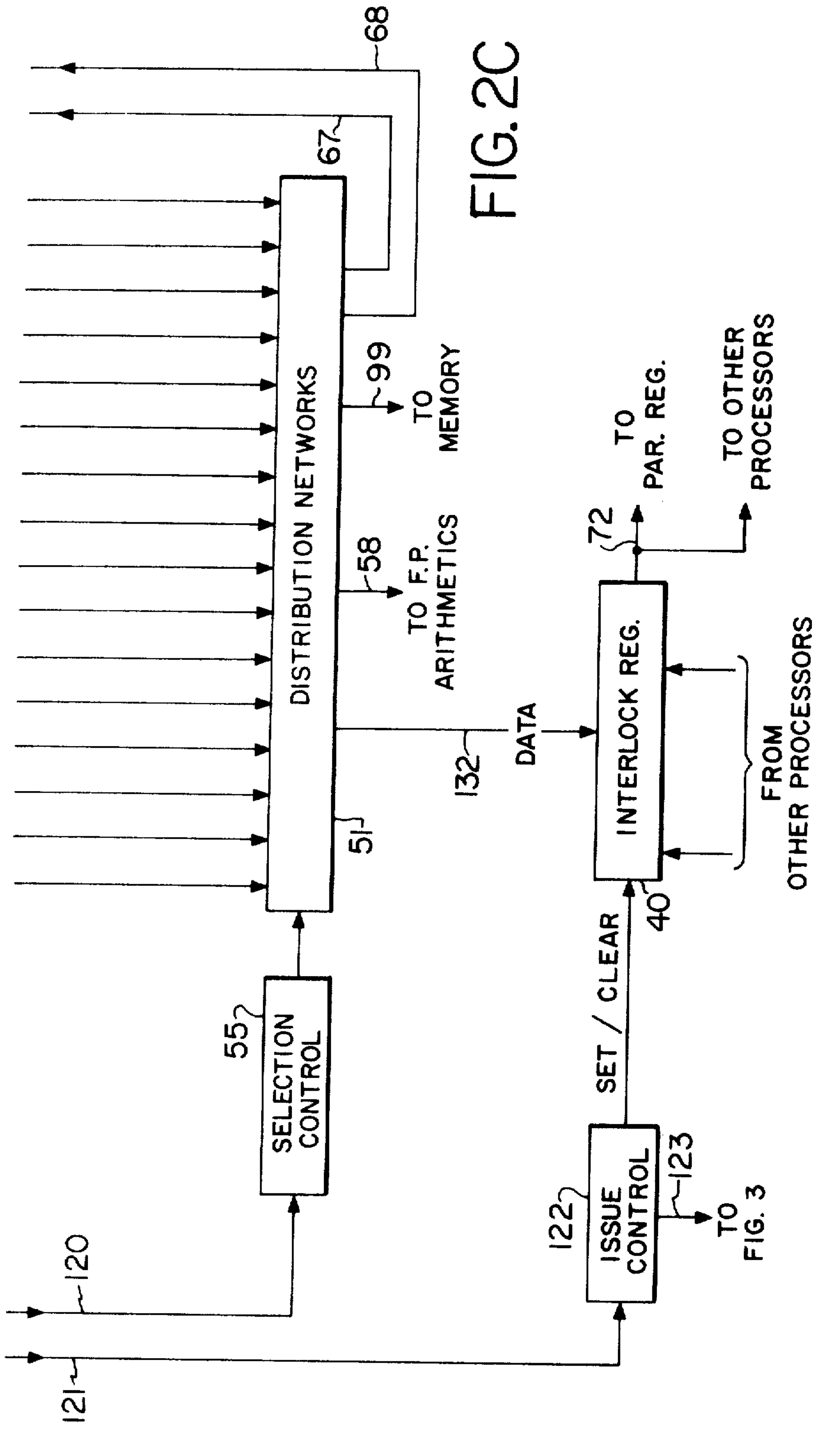
Figure 2D:
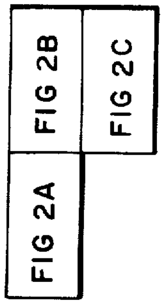

With reference to FIGS. 2A, 2B and 2C, when edge matched as shown in FIG. 2D, there is illustrated a portion of a typical processor 30–33 for controlling the operation of a plurality of registers 50. The plurality of registers 50 may comprise 16 individual registers designated 00 through 15, inclusive, each having a 64-bit capacity. Also, and as shown particularly in FIG. 2B, the registers may be geometrically divided into four sections designated RA, RB, RC and RD, inclusive, each having a capacity of 16 bits. Thus, for any individual register, the first 16 bits will be placed in the RA section, bits 17 through 32 will be placed in the RB section, bits 33 through 48 will be placed in the RC section and bits 49 through 64 will be placed in the RD section. Each register 00 through 15 has an output to distribution network 51. Also, each register has an input through a plurality of AND gates 52 from merge network 53. AND gates 52 are selectively controlled by access control 54 which in turn is controlled by the instruction control shown generally in FIG. 2A.

Merge network 53 has, as inputs thereto, inputs from floating point arithmetics 56 (which might include a floating point divider, floating point multiplier and floating point adder), memory 34 via channel 65, parameter register 62, and controls 57 (which might include an integer (or long) adder, a boolean control, and a shift control). Controls 57 receive inputs from operand register 63, and operand register 64. Operand register 63 has inputs from the instruction control via channel 66, and from distribution network 51 via channel 67. Distribution network 51 has outputs via channel 68 to operand register 64 and through complement circuit 69 to register 64, to floating point arithmetics 56 via channel 58, to interlock register 40 via channel 132, and to memory 34 via channel 99. Operand register 64 receives inputs from register designator 70, mask controller 71 and from the instruction control via channel 73. Parameter register 62 receives inputs from interlock register 40 via channel 72, from the instruction control via channel 73 and from external access controller 74. Suitable pack and unpack circuits (not shown) may also provide inputs to networks 53 for floating point functions obvious to one skilled in the art.

The instruction controller, shown in FIG. 2A, has an input from memory 34 via channel 75 to instruction word stack 78. Instruction address stack 77 has an input from next statement address 76 which is incremented via positive increment controller 59. As will be more fully understood hereinafter, a single instruction address stack 77 and an instruction word may comprise a 64-bit word channeled to instruction word stack 78 from memory. Shift controller 79 has an input to instruction address 77 and to shift controller 80, which in turn has an output to instruction word stack 78.

Program address register 81 has an input from OR gate 82 which in turn has inputs from plus or minus increment controller 83 and branch address 84. Increment controller 83 receives its input from address register 81 thereby forming a loop, while branch address 84 has input from the RA and RB Sections of registers 50 via channels 85, 86 respectfully. Branch address 84 has a 20-bit capacity so that it receives all 16 bits from the RA section of any RA register of registers 50 and receives 4 bits from the corresponding RB section of registers 50. Program address register 81 has outputs to coincidence test controller 87, to next statement address 76 and to operand register 63 via channel 66. Coincidence test controller 87 compares the program address in register 81 with the instruction address in stack 77, and provides control outputs to parcel control 88, rank control 89 and out-of-stack flag 100. Rank controller 89 provides suitable gate signals to AND gates 90 to control transfer of instruction words from instruction word stack 78 to current instruction word register 91. Parcel controller 88, which is incremented by positive increment controller 60, provides suitable gate signals to AND gates 92 and 93 to control transfer of bits to translator 94 and to program register 95, respectively. Translator 94 provides an output to access controller 54 and selection controller 55 via channel 120 while program register 95 provides an output via channel 73 to parameter register 62. Translator 94 receives a 16-bit instruction parcel from register 91, while register 95 may receive 16 bits of a 20-bit program code from register 91. As will be more fully understood hereinafter, if a program code is to be transferred to register 95, the other four bits of the 20-bit program code will be supplied from translator 94.

Translator 94 also provides an output via channel 121 to issue controller 122, which in turn provides an output to data storage reference group 111 (FIG. 3) via channel 123, and it provides set and clear signals to interlock register 40.

Exchange parameter word register 61 is connected to the output of 00 register 50 to receive the entire 64-bit word contained therein. Register 61 is adapted to provide a 20-bit program address code via channels 85 and 86 to branch address 84, an 8-bit exchange address code via channel 124, a 12-bit reference address code via channel 125 and a program reference flag bit via channel 126.

Figure 3:
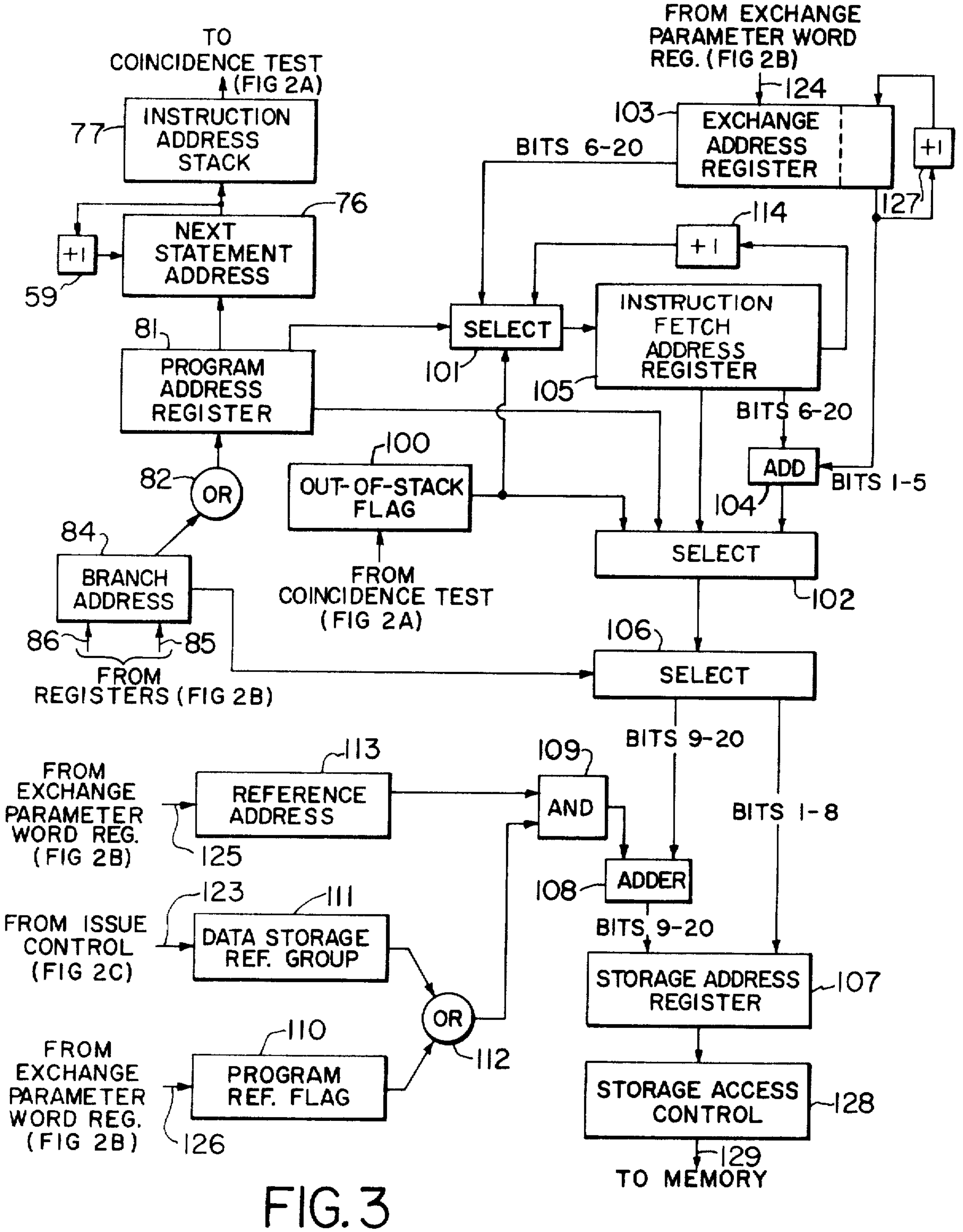
FIG. 3 is a block diagram of a portion of the control section of an individual processor as particularly applicable for out of stack instruction access.

FIG. 3 illustrates a block logic diagram of circuitry associated with the instruction address and word modules for acquiring instruction words from memory. As shown in FIG. 3, program address register 81 has outputs to select circuits 101 and 102. Exchange address register 103 has two outputs, one to select circuit 101 and another to adder 104. Exchange address register 103 has a 20-bit capacity such that the first five bits are forwarded to adder 104 while the last 15 bits are forwarded to select circuit 101. The first five bits are also recycled through positive increment controller 127 thereby forming a counter. Select circuit 101 has an output to instruction fetch address register 105. Select circuits 101 and 102 have further enable inputs from out-of-stack flag 100.

Instruction fetch address register 105 has a first output to increment adder 114 which adds binary 1 to the contents of register 105 and forwards the result to select circuit 101. A second output from register 105 forwards the 15 most significant bits contained therein to adder 104 for combination with the five least significant bits from register 103 for forwarding to select circuit 102. A thrid output from register 105 provides for transfer of the contents (20 bits) of the register directly to select circuit 102.

Select circuit 106 receives one input from select circuit 102 and a second from branch address 84 (which in turn receives a 20-bit input from the RA and RB portions of registers 50—FIG. 2B). Thus, select circuit 106 will transfer a 20-bit code, whether received from branch address 84 or received from select circuit 102.

The eight least significant bits from select circuit 106 are transferred directly to storage address register 107 for operation on the storage access control 128 associated with memory 34 via channel 129. The 12 most significant bits from select circuit 106 are forwarded to adder 108 where they are binarily added to the output from AND gate 109 and the result is forwarded to register 107 as the 12 most significant bits therein.

Program reference flag 110 and data storage reference group 111, which receive inputs from register 61 and control 122, respectively, provide gate signals to OR gate 112 which in turn provides a gate signal to AND gate 109. Reference address register 113 provides a 12-bit reference address from register 61, which when gated by AND gate 109, is added to the 12 most significant bits from select circuit 106 for transfer to register 107 as the 12 most significant bits therein.

OPERATION

With reference to FIGS. 2A, 2B and 2C, which taken together as shown in FIG. 2D, illustrate a block circuit diagram of the control portions of an individual processor 30—33, an instruction word is received from memory 34 by instruction word stack 78 via channel 75, and an instruction address is received from registers 50 via channels 85 and 86. The instruction address might, for example, comprise 20 bits while the instruction word might comprise 64 bits. As will be more fully understood hereinafter, it is the instruction address that locates a particular instruction word for operation. The instruction addresses are stored in instruction address stack or register 77 and the instruction words are stored in instruction word stack or register 78. By way of example, stack 77 may be capable of storing up to twelve addresses, and stack 78 may be capable of storing up to 12 64-bit words.

Assuming that a proper instruction address and its associated instruction word are stored in stacks 77 and 78, and that the RA and RB sections of X register 50 have been conditioned to cause that instruction to control some processing operation (e.g. addressing, indexing or arithmetic), a 20-bit code is forwarded via channels 85 and 86 to branch address 84. Branch address 84 receives the entire 16-bit RA portion of the conditioned one of the 16 X registers, as well as the first four bits from the corresponding RB portion. This 20-bit code is forwarded through OR gate 82 to program address register 81. The 20-bit address is forwarded to coincidence tester 87 and to next statement address 76 which operates on stack 77 to locate the particular address therein. If the proper address is present in stack 77, coincidence tester 87 determines the coincidence between the addresses in register 81 and stack 77, and forwards a control signal to rank controller 89. Rank controller 89 provides a gate output to AND gates 90 so that the corresponding word in stack 78 is forwarded to current instruction word register 91.

If the designated instruction address is not conditioned for immediate output to coincidence test 87, no coincidence is determined by tester 87, and shift controller 79 will step stack 77 to sequentially provide other addresses in stack 77 until a coincidence is determined in tester 87. Simultaneously shift controller 79 controls shift controller 80 to correspondingly step the instruction words stored in stack 78 so that when a coincidence is determined in tester 87, the proper current instruction word is located at the output of stack 78.

Rank controller 89, when operated by tester 87, conditions stack 78 to transfer the current instruction word from stack 78 to current instruction word register 91.

It should be recognized that any instruction address contained in stack 77 may be accessed. Thus, increment circuit 83 is capable of selectively incrementing both positive and negative so the addresses may be gathered sequentially in either ascending or decending order.

The instruction words stored in memory, in stack 78 and in register 91 are 64-bit words containing four 16-bit parcels. A single instruction may comprise one or two parcels (16 or 32 bits). A one parcel instruction will consist of a 4, 6 or 8-bit instruction code and one or more designator codes which will control operation of access and/or selection controllers 54 and 55. A two parcel instruction will consist of a 4 to 8-bit instrustion code, a designator code or codes, and a 20-bit program code for destination to parameter register 62 and/or operand register 64.

As will be more fully understood hereinafter, the X registers 50 are controlled for a selected one of plurality of conditions, i.e. internal transfer, output to operand register 63, output to operand register 64, output to interlock register 40, output to the floating point arithmetic units, and output to memory. These outputs are controlled by the instruction code and the designator codes. In the case of a one parcel instruction, the parcel will have one of the following formats:

(i)

| F | i | j | k |
|---|---|---|---|
| 4 | 4 | 4 | 4 |

(ii)

| F | n | j | n |
|---|---|---|---|
| 6 | 2 | 4 | 4 |

(iii)

| F | j | k |
|---|---|---|
| 8 | 4 | 4 |

where F is the instruction code, *i*, *j* and *k* are designator codes for operand source and destination, and *n* is a constant. In the case of a two parcel instruction, the one of the following formats is available.

(iv)

| F | i | j | K |
|---|---|---|---|
| 4 | 4 | 4 | 20 |

(v)

| F | j | K |
|---|---|---|
| 8 | 4 | 20 |

where K is a 20-bit program code for parameter register 62 and/or operand register 64.

Thus, in case i, the instruction will consist of a 4-bit instruction code, a 4-bit *i* designator, a 4-bit *j* designator and a 4-bit *k* designator. In case ii the instruction will consist of a 6-bit instruction code, a 2-bit constant, a 4-bit *j* designator and a 4-bit constant. In case iii the instruction will consist of an 8-bit instruction code, a 4-bit *j* designator and a 4-bit *k* designator. In case iv the instruction will consist of a 4-bit instruction code, a 4-bit *i* designator, a 4-bit *j* designator and a 20-bit program code. In case v the instruction will consist of an 8-bit instruction code, a 4-bit *j* designator and a 20-bit program code. It is noteworthy that in each case the instruction code occupies the first 4, 6 or 8-bit positions, the *i* deisgnator occupies the second 4-bit positions (in the case of 4-bit instruction codes only), the *j* designator occupies the third 4-bit positions, the *k* designator occupies the fourth 4-bit positions (in the case of one parcel instructions only) and the program code consists of the last 20-bit positions (in two parcel instructions only).

X registers 50 comprise 16 64-bit registers. Each piece of information, whether data or instructional, is accompanied by one or more designators (e.g., *i*, *j* or *k*). This designator is determined either by register designator 70 or from the designator codes contained in the instruction words. The designators are not addresses which determine the location of storage of information, but instead are merely designators to enable retrieval of the information in a predetermined manner. Thus, as used hereinafter, the terms X*i*, X*j* and X*k*, when denoting a part, or used in connection with, X registers 50, merely means those registers or portions of registers which are to receive information, or from which information is to be gathered, as the case may be.

Each instruction carries with it a 4, 6 or 8-bit instruction code (F) which dictates which of the X*i*, X*j* or X*k* registers, or any of them, are entry and resultant operand registers. For example, an instruction code (F) which dictates addition of the contents of the X*i* and X*k* registers will cause those registers identified by the *i* and *k* designators to be entry operand registers. If the same instruction code (F) dictates that the addition result (formed by the long add 57 or the floating point arithmetics 56) be forwarded to the X*j* register, the resulting computation is forwarded to that register identified by the *j* designator to be the resultant operand register. Thus, the entry and resultant functions are dictated by the instruction code, and not necessarily by the designator. Obviously, any of the X*i*, X*j* and X*k* registers may be entry or resultant operational registers, depending upon the particular instruction and upon later use of the information. For further elaboration of the format of the instruction words, reference may be had to Pat. No. 3,346,851 granted Oct. 10, 1967 to James E. Thornton and Seymour R. Cray for "Simultaneous Multiprocessing Computer System", and particularly to column 7 et seq. thereof, but care should be taken in referring thereto in as much as the operation of the processor on the instruction words therein differs from the present invention at least to the extent described herein.

A reservation flag is provided for each of the 16 X registers 50. When set, the flags remain set until specifically cleared. When translator 94 issues an instruction containing a designator (*i*, *j* and/or *k*) which designates a particular X register as the destination register, the X reservation flag for that register is set in a manner dictated by the designator. Translator 94 examines the instruction code of each instruction to determine the instruction (or control function) and examines the *i*, *j* and *k* designators to determine which of the 16 X registers is to be operated and in what manner.

For example, assume it is desirable to read information from X register 08 which carries a *k* designator (X*k* of register 08) and copy that information into register 12 to carry a *j* designator (X*j* of register 12). The instruction may consist of a one parcel instruction in the form of case iii whose instruction code (F) instructs a read operation from some X*k* register via channel 68 to operand register 64 and thereafter write the data into some X*j* register. The specific X*k* and X*j* registers are determined from the *k* and *j* designators, respectively.

As another example, assume it is desirable to read information from register 08 which carries the *j* designator, add some program code (K) to it, and copy the result into register 12 carrying an *i* designator. In this case the instruction will consist of two parcels in the form of case iv whose instruction code instructs a read operation from some X*j* register to operand register 63, a transfer of the program code (K) to operand register 64, an addition of the data in registers 63 and 64 by long add controls 57, and writing the result into some X*i* register. The specific X*i* and X*j* registers are determined from the *i* and *j* designators, and the value of K is carried with the instruction as the 20-bit program code in register 95.

MERGE AND DISTRIBUTION NETWORKS

The merge networks 53 and distribution networks 51 are static logic switching networks responsive to gate signals to selectively access selected ones of registers 50. As is more fully explained elsewhere herein, instructions issued from translator 94 includes 4-bit designator codes (designated *i*, *j* and *k*). As will be more fully understood hereinafter, the *i*, *j* and *k* designators are used to designate particular registers from which and/or to which data is directed. The 4-bit designator codes operate on the logical switching networks of the merge (fan-in) and distribution (fan-out) networks to selectively gate the data to and from the selected registers. The exact nature of these networks are apparent to one of ordinary skill in the art, given the fact that the designator codes, together with the instructions selectively operate them. For example an instruction "Floating Single Precision Multiply Of X*j* Times X*k* to X*i*" will contain an instruction code (F) and *i*, *j* and *k* designators. The four bit *j* and *k* codes are issued by translator 94 to distribution network 51 to operate logical gates to select two registers (designated by the *j* and *k* designators) and to forward the data therefrom via channel 58 to the floating point arithmetic 56 (actually to the multiply circuits therein). The four bit *i* designator is forwarded to gate 52 (which is representative of the logical merge gates) to select a register (designated by the *i* designator) to which the result from floating point arithmetics 56 is to be stored. Other aspects of merge and distribution networks 51 and 53 will be more readily understood from elsewhere herein, particularly from the examples set forth hereinafter.

PARCEL CONTROL

As heretofor a 64-bit instruction word consists of four 16-bit parcels, one or two of which may comprise an instruction. Thus, the 16-bit parcels, one or two of which may comprise an instruction. Thus, the permissible combinations of parcels comprising any particular word are:

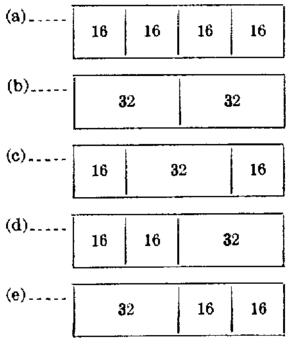

Parcel controller 88 receives an input from the current address (via coincidence tester 87) to control which, and how many, parcels of the current instruction word shall be used to form an instruction. If the instruction comprises one parcel, parcel controller 88 selects that parcel from current instruction word register 91 and gates AND gate 92 to cause the selected 16-bit parcel to be transferred to translator 94. If the instruction is a two parcel instruction, parcel controller selects the two parcels from current instruction word register 91 and gates AND gates 92 and 93 to cause the 12-bit instruction and the first four bits of the program constant to be transferred to translator 94 and the last 16-bits of the program constant to be transferred to program register 95. The first 4 bits of the program constant are then transferred from translator 94 to register 95.

In operation, when a current instruction word is first presented to register 91, parcel controller 88 operates to transfer the first parcel thereof to translator 94, and, if the first parcel is part of a two parcel instruction, to transfer the second parcel to register 95 while simultaneously stepping by one through increment circuit 60. After the first instruction issues, parcel controller again is incremented by one through increment circuit 60 to gain access to the second (or third) parcel. The process continues until the complete word is read.

It may be necessary in certain circumstances to issue a parcel pass control to complete a 64-bit instruction word. This is done to avoid starting a two parcel instruction in the fourth parcel of an instruction word.

OUT-OF-STACK INSTRUCTIONS

Situations may arise wherein instruction words intended for translator 94 (and register 95 in the case of two parcel instructions) are not contained in instruction word stack 78. Such a condition can occur in jump instructions wherein a current program sequence is terminated and a new sequence is commenced. Assume that such a jump instruction consists of two parcels and is forwarded to translator 94 and register 95. The jump instruction (16 bits) is forwarded to control 52 via access control 54 from translator 94. Simultaneously, a 20-bit K code, whose value is dependent upon the number of steps to be jumped, is forwarded from register 95 to operand register 64 via channel 73. Also, the current instruction address (P) is forwarded from program address register 81 (FIG. 2A) to operand register 63 (FIG. 2B). Integer adder 57 is operated to add the jump value K to the current address P and forward the result to the RA AND RB sections of X registers 50 for transferral to program address register 81 via channels 85 and 86, branch address 84 and OR gate 82.

If the new (jumped) address corresponds to one in instruction address stack 77, shift controller 79 operates to shift the stack to the corresponding address until coincidence is detected in tester 87. Similarly, the instruction word stack 78 is also shifted in the corresponding instruction word for operation as heretofore described. Intermediate addresses in stack 77 and words in stack 78 are discarded.

If, however, the new (jumped) address does not correspond to an address in stack 77, no coincidence is detected by tester 87. Instead, coincidence tester sets out-of-stack flag 100 for operation on select circuits 101 and 102 (See FIG. 3). The new address (P + K) is transferred to instruction fetch address register 105 via select circuit 101, to select circuit 106 via select circuit 102, and to next stack address 76. The 12 most significant bits of the new address (P + K) are transferred to adder 108 where a program reference flag from flag 110 and exchange parameter word register 61 (FIG. 2B) is added to the new address (via OR gate 112 and AND gate 109). The reference flag is transferred to storage address register 107 for operation on the storage access control 128 associated with memory 34. Thereafter, bits 1–8 of the address are transferred from select circuit 106 to register 107.

As will be more fully understood hereinafter from the section entitled "Exchange Jumps," exchange parameter word register contains a reference address of the object program (that is, an address of memory 34 wherein the object program is stored). The reference address, which is unique to the object program, is added to the 12 most significant bits of the address forwarded from select circuit 106 for operation on storage access control 128.

The new address is thereafter transferred from next stack address 76 to the twelfth rank of instruction word stack 77 and the instruction word, retrieved from memory 34, is placed in instruction word stack 78 via channel 75 (FIG. 2A).

Coincidence tester 87 now notes the coincidence between the new address in register 81 and the new address in stack 77 and issues rank and parcel control commands to permit the new instruction to be transferred to current instruction word register 91 for operation as heretofore described.

Only a single instruction is transferred from memory to the instruction word stack by the foregoing method. However, if it is desired to bring up a group of instructions, the instruction fetch address register is incremented through adder 114 causing an entire group of instruction words to be transferred from memory to instruction word stack 78. Simultaneously, program address register 81 is incremented through increment circuit 83 (FIG. 2A) to permit the corresponding addresses to be inserted into instruction address stack 77.

LIBRARY CALLS

It may be desirable in certain circumstances to cause a jump to a portion of memory 34 containing a library routine available for use by all processors. For example, and with reference to FIG. 4, assume user R is operating on an object program having an address (with reference to memory 34) which commences at $RA_R$ and has a field length $FL_R$. Assume further that the object program contains an instruction located at 130 which instructs the processor to jump to a resident library routine contained in memory 34, outside of the object program field at 131. A library call instruction issued by the object program causes access to the resident library routine.

In this case, a two parcel library call instruction issues from translator 94 to transfer a program code (K) comprising the absolute library address to operand register 64 (FIG. 2B) and to transfer the instruction address from register 81 (FIG. 2A) to operand register 63 (FIG. 2B). The instruction address stack 77 is cleared and any instruction fetches sought by the controls shown in FIG. 3 are aborted. Out-of-stack flag 100 is set (because no coincidence can be detected in tester 87), thereby gating select circuits 101 and 102 (FIG. 3) to receive addresses. The library address (K) is generated through long add controls 57 and is transferred to program address register 81 via X registers 50 and channels 85 and 86, as heretofore explained. The library address in register 81 is then transferred to instruction fetch address register 105 and to next statement address 76. The address issues through storage access control 128 in the manner heretofore described, causing access to the portion of memory 34 associated with the library address (in this case to the library field indicated at 131 in FIG. 4). It should be noted that neither the program reference flag nor the data storage reference group bit is set so the object program reference address in register 113 is not added to the library address. Consequently, only the absolute address of the library routine is transferred to storage access control 128, and the processor is conditioned to operate in the field of the library.

Library instructions are thereafter forwarded via channel 75 to instruction word stack 78 (FIG. 2A) for operation in the processor.

The library address in instruction fetch address register 105 (FIG. 3) is incremented through increment circuit 114 so successive addresses of the library are forwarded to storage access control 128 to enable the instruction words of the library routine to be forwarded to instruction word stack 78 in sequence. The library address in next statement address 76 is also incremented by increment circuit 114, and the library address in program address register 81 is incremented by increment circuit 83. Consequently, a coincidence will occur in coincidence tester 87, thereby removing the out-of-stack flag 100 and operating rank controller 89 and parcel controller 88 to issue library instructions.

Figure 4:
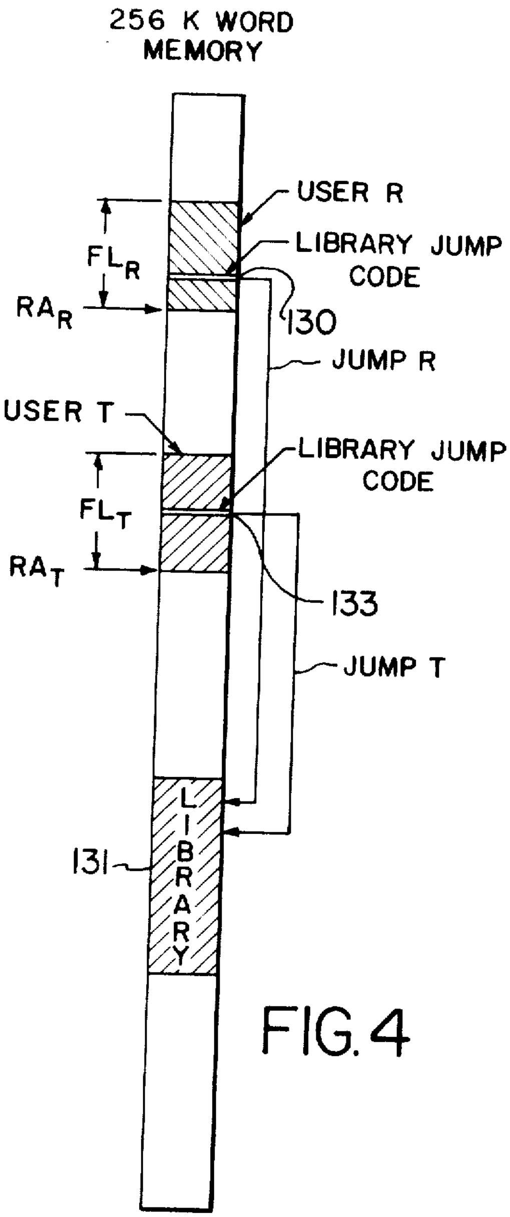
FIG. 4 is a representation of a memory showing the operation of an access operation.

One feature of the absolute library address technique resides in the fact that several of the processors can simultaneously gain access to the same library routine. In this respect two or more processors can gain access to a particular library routine by issuing the absolute address of the library routine so that each receives instruction words from the library. Thus, and as shown in FIG. 4, user R having a field length $FL_R$ and a library call instruction at 130 can jump to the library field at 131, and user T having a field length $FL_T$ and a library call instruction 133 can jump to the same library field 131.

EXCHANGE JUMPS

It may be desirable in certain circumstances to acquire data entirely from a location outside the field length of an object program. For example, upon completion of one object program, a processor may wish to jump to another object program.

In this case, a two parcel exchange instruction issues from translator 94 to transfer a program code (K) to operand register 64 and to transfer the exchange program address to operand register 63. The instruction address stack 77 is cleared and any instruction fetches sought by the controls in FIG. 3 are aborted. Out-of-stack flag 100 is set (because no coincidence can be detected by tester 87 due to the cleared condition of stack 77), thereby gating select circuits 101 and 102 to receive addresses. The exchange jump address is generated by the long add controls 57 (program address + K) and is transferred to program address register 81 via X registers 50 and channels 85 and 86, as heretofore explained. The exchange address issues through storage access control 128 as heretofore explained, causing the contents of the exchange package to be entered into X registers 50 from memory via channel 65 and merge networks 53.

The exchange package consists of sixteen 64-bit data words and one 64-bit exchange parameter word. The exchange parameter word of the exchange package moves first, followed by exchange data words for the 00 through 15 X registers in sequence. The exchange parameter word, arriving first, is temporarily stored in the 00 X register and, one clock period later is transferred into exchange parameter word register 61. The exchange data words fill the 00 through 15 registers in sequence.

Figure 5:
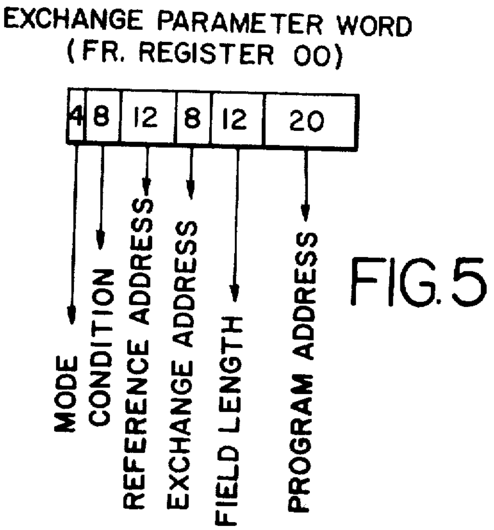
FIG. 5 is a representation of an exchange parameter word format for use in an access operation.

The format of the exchange parameter word is shown in FIG. 5 and consists of a 20-bit program address, a 12-bit field length code (indicative of the length of the exchange package) an 8-bit exchange address (corresponding to K, the address of the exchange), a 12-bit reference address (corresponding to the address of the object program—RA), an 8-bit condition code and a 4-bit mode control code. As shown particularly in FIGS. 2B, 3 and 5, the 20-bit program address of the exchange parameter word is transferred to program address register 81 via channels 85 and 86 and branch address 84, the 8-bit exchange address is transferred to exchange address register 103 via channel 124, the 12-bit reference address is transferred to reference address register 113 via channel 125, and a program reference flag is transferred from the mode control portion of the exchange parameter word in register 61 to register 110 via channel 126. (It is understood, of course, that in reality, registers 103, 110 and 113 may physically be part of register 61 and are shown as separate units for purposes of explanation. As a unitary structure, the outputs 124, 125 and 126 from register 61 will, of course be connected directly to select circuit 101, AND gate 109 and OR gate 112, respectively.)

Figure 6:
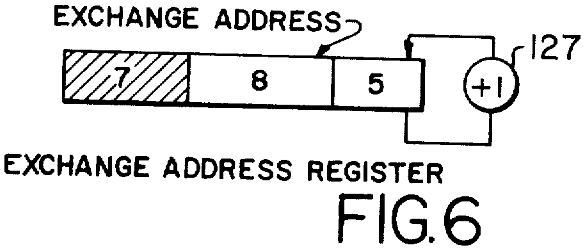
FIG. 6 is a representation of an exchange address format for use in the exchange parameter word.

The format of storage of the exchange address in exchange address register 103 is shown in FIG. 6. As shown in FIG. 6, register 103 is a 20-bit register whose five least significant bits are arranged in a forward counter arrangement with increment circuit 127 (FIG. 3), whose next eight bits store the 8-bit exchange address code, and whose seven most significant bits are not used (hardwired to binary zeros).

With reference to FIG. 3, the operation of the exchange jump can now be explained. After the first address of the exchange package program address has been forwarded via channels 85 and 86 from register 61 (FIG. 2B) to branch address 84 (FIGS. 2A and 3), the address is forwarded to program address register 81 and thence to next statement address 76 and select circuits 101 and 102. Instruction fetch address register 105 is set with the first address, the exchange address is stored in register 103, and the reference address is set in register 113. The reference address is passed to adder 108 via AND gate 109, gated by the program reference flag in register 110 via OR gate 112. (The program reference flag is one of four mode control flags stored in register 61. The other three flags, when set, include (1) a monitor flag to permit access to input/output devices and prevent interrupt cycles, (2) an interlock flag to gain access to interlock register 40 in a manner to be described, and (3) a floating point interrupt flag permitting interrupt on the floating point arithmetic whenever an overflow or indefinitness occurs).

The first address is forwarded to select cicuit 106 as heretofore described. The eight least significant bits of the first address are thereafter forwarded to register 107 and thence to storage access control 128 as heretofore described. The object program address (reference address) is added to the exchange address of the exchange package by adder 108 and is forwarded as the twelve most significant bits to register 107 for operation on control 128.

Upon receipt of an acknowledgement flag from memory, the counter portion of register 103 (the five least significant bit positions) is incremented by one via increment circuit 127, thereby adding binary one to the exchange address inputed to adder 104. Therefore, the exchange address code is incremented by one thereby adding one to the combined reference address and exchange address codes appearing in register 107. In this manner, access is gained to the addresses of the entire exchange package by incrementing the exchange address code and by the reference address.

One clock cycle before the exchange package instruction word is forwarded to instruction word stack 78 from memory via channel 75, next statement address 76 is incremented by increment circuit 76 to transfer the corresponding program address to instruction stack 77 so that during the next clock cycle a coincidence occurs in tester 87 permitting the instruction to be transferred from instruction word stack 78 to current instruction word register 91 for issuance as heretofore described.

Upon completion of an exchange package, another jump occurs back to the field of the object program or to another out-of-field routine, by relinquishing control of the exchange address register.

READ/WRITE ROUTINE

Upon issuance of a read or a write command from translator 94 (FIG. 2A), a bit (or flag) is set in issue control 122 (FIG. 2C). This bit, sometimes hereinafter called a data storage reference group bit, operates through register 111 via channel 123 on OR gate 112 (FIG. 3). (It should be recognized that issue controller 122 may itself be a register in which case the data storage reference group bit may be hardwired directly to OR gate 112, thereby eliminating the necessity of a separate register 111). The bit from register 111 gates AND gate 109 permitting adder 108 to add the reference address ($RA_R$, for example) to the program address. Thus, data read out of X register 50 via channels 99 (FIG. 2C) for storage in memory 34 (FIG. 1) is stored at addresses dictated by the reference address (RA) as added to the program address (in the field). Similarly, data read out of memory for X registers 50 (via channels 65, FIG. 2B) is read from locations dictated by the reference address (RA) as added to the program address.

INTERLOCK CONTROL

Interlock register 40 accomplishes two significant functions: one, to transfer data between processors 30–33 without forwarding through memory, and two, to advise other processors of the completion of a processing operation where two or more processors are working on different parts of a single problem. (Of course other significant uses for interlock register 40 will be apparent to one skilled in the art, but for the purposes of description herein only the two assigned functions need be described).

When it is desired to transfer data to another processor via interlock register 40, such as if data is to be transferred when the receiving processor is ready to operate on it, translator 94 in the sending processor causes a read-out of the selected data from X register 50 via channel 132 to interlock register 40. At the same time, translator 94 sends a control signal to issue control 122 via channel 121 causing a signal to be sent to register 40 to cause the register to store the data.

When a processor is ready to receive data from interlock register 40, translator 94 issues control commands to access controller 54 and issue controller 122 causing the data in interlock register 40 to be transferred via channel 72 to the parameter register 62 of the receiving processor, and to clear the interlock register.

On the other hand, if data is to be transferred to another processor through memory 34, as might be occasioned to where the issuing processor is to go on with another routine, translator 94 and issue control 122 operate to set a flag in interlock register 40 and to transfer data from X registers 50 via channel 99 to memory 34 as heretofore described. When the receiving processor, is to accept such data it may read the interlock register set flag and acquire the data from memory via its channel 65.

MEMORY ACCESS

As heretofore described, storage address register 107 receives a 20-bit address from adder 108 and select circuit 106 (FIG. 3). Also as heretofore described, the eight least significant bits of the 20-bit code are derived from one of three sources: (1) the program address (from either branch address 84 to select circuit 106 or from program address register 81 to select circuit 102 to select circuit 106), (2) the instruction fetch address from register 105 as incremented through increment circuit 114 and forwarded to select circuit 106 via select circuit 102, and (3) the 15-bit exchange address from register 103 through select circuit 101 and register 105, and the 5 bits from counter section as incremented by increment circuit 127 and added the 15-bit exchange address by adder 104. Also as heretofore described, the twelve most significant bits of the 20-bit code are derived from select circuit 106 (via any one of the three forgoing processes) as added to the reference address by adder 108 when AND gate 109 is gated by either the program reference flag 110 or the data storage reference group bit 111. Consequently, it is evident that the reference address of the object program affects only the 12 most significant bits of the contents of storage address register 107; the eight least significant bits being derived from one of the three sources as heretofore described.

Figure 7:
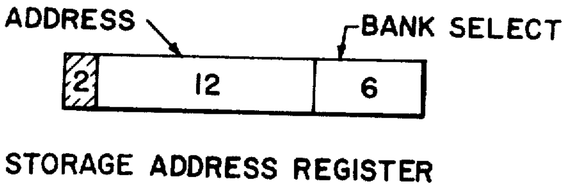
FIG. 7 is a representation of an instruction for memory access.

As shown in FIG. 7, the six least significant bits of the address code (constituting the six least significant of the eight least significant bits) control bank select in memory 34. The next 12 bits (constituting the two most significant of the eight least significant bits and the 10 least significant of the 12 most significant bits) dictate the address location in a selected memory bank.

Memory 34 may consist of 64, 4K word memory banks. The 6-bit bank select code selects a particular bank while the 12-bit address code selects a particular word from that bank. As heretofore described, the least significant bits are sequentially stepped for sequential instruction words. Thus, each successive address is stepped to the next bank, rather than to the next address in a single bank. This technique has the effect of sequentially stepping through the banks for the successive instruction words, so that the liklihood that any one of the 64 banks becomes overloaded by requests becomes statistically small.

Although the storage access control signal consists of the 18 least significant bits of the 20-bit code in register 107 with the upper two bits not being used, these upper bits may be used in the case of an expanded memory for selecting which, of up to four 256K word memories are accessed. Thus, with the addition of three additional memories, it is possible to expand the memory to as much as 1024 K words (about 65.5 million bits).

EXAMPLES

The registers 50 are accessible by the programmer-operator through the input/output controls and memory 34 to program data and instructions into the computer for computational operations. In order to explain the universal aspects of registers 50, and particularly how they function in different operational modes, the following examples are set forth. It should be remembered, at this point, that many of the addressing capabilities have already been described, particularly in connection with the RA and RB portions of registers 50 and the exchange parameter word register 61.

ARITHMETIC OPERATIONS

1. Logical Product of X*j* and X*k* to X*j* — This instruction causes operands to be read from the registers designated by the *j* and *k* designators to operand registers 63 and 64. The operands are then manipulated by the Boolean and shift circuits with the result entered into the register designated by the *j* designator. After translator 94 issues the instruction and the *j* and *k* designators are forwarded to register 50 and the *j* destination register flag is set, the data in the X*j* and X*k* registers is read out and the reservation flag is cleared. During the next clock period, the logical product of the controls of the X*j* and X*k* register is forwarded back to the X*j* register.

2. Logical sum of X*j* plus X*k* to X*j* — This is similar to case 1, except the Boolean add circuits are used.

3. Logical difference of X*j* minus X*k* to X*j* — This is similar to the cases 1 and 2, except the Boolean subtract circuits are used. In cases 1 and 2, if the *j* and *k* designators designate the same entry register, the 64 bit word is merely read out of the register and thereafter re-entered into the same register. In case 3, however, if the *j* and *k* designators are the same, a 64 bit word containing all 0's is written into the register.

4. Floating Double Precision Sum or Difference of X*j* and X*k* to X*j* — In these cases the data in the designated X*j* and X*k* registers are read into the floating point add module 56 where they are added. The details of addition are not important to an understanding of the present invention, but suffice it to say that the upper half result is normalized while the lower half result is not. The lower half is entered into the register designated by the *j* designator. For subtract operations, the subtrahend (X*k* data) is first complemented and is added to the minuend (X*j* data) in a manner well known in the art. Double precision is thereafter accomplished by a single precision floating sum or difference of X*j* and X*k* to X*i* (case 5).

5. Floating Single Precision Sum Or Difference of X*j* and X*k* to X*i* — In this case the upper half result from case 4 is entered into the register designated by the *i* designator.

6. Floating Divide of X*j* by X*k* to X*j* — In this case the operands from the registers designated by the *j* and *k* designators are forwarded to the floating point divide module 56 to form a quotient which is transmitted to the register designated by *j*. The remainder from the division process is discarded. If the division operand is not normalized, the out-of-range flag is set.

7. Floating Double Precision Product of X*j* Times X*k* to X*j* — In this case two normalized floating point operands from the registers designated by the *j* and *k* designators are forwarded to the floating point multiply module 56 to form three 16 by 48-bit products which are merged into a 96-bit result register. The lower 48 bits of the result and the exponent are forwarded to the register designated by the *j* designator (complemented if negative).

8. Floating Single Precision Multiply Of X*j* Times X*k* to X*i* — In this case the upper half result from case 7 is entered into the register designated by the *i* designator.

9. Integer Product of X*j* Times X*k* to X*j* — This case is similar to case 7 except the exponent arithmetic portion of the floating point module is not used and the lower 64 bits of the 96-bit product derived by the floating point arithmetic are entered into the register designated by *j*.

10. Long Add Or Subtract X*j* and K to X*j* or X*i* — In these cases the program constant (K) from register 95 is read into register 64 (complemented if a subtraction is to be accomplished) and the data in the register designated by the *j* designator is read into register 63. The contents of registers 63 and 64 are long added by the controls 57 and the result is entered into the register designated by the *j* or *i* designator, as the case may be.

11. Integer Difference of Zero Minus X*k* to X*j* — In this case the complement of the data in the register designated by *k* is read through complement circuit 69 to register 64, and the result is added to all 0's from register 63 by the long add controls 57 and finally entered into the register designated by *j*. Any overflow is carried into another adjacent register, designated X*i*.

12. Integer Sum Or Difference of X*j* and X*k* to X*i* — In these cases the data in the register designated by *j* is read into register 63 and the data is the register designated by *k* (complemented in the case of a subtract operation) in entered into register 64. The contents of registers 63 and 64 are added by long add controls 57 and the result is entered into the register designated by the *i* designator.

JUMP AND CALL

13. Jump to or Call Subroutine At P + K — In this case the current program sequence is terminated in favor of a new sequence. The program address (P) is forwarded from register 81 via channel 66 to register 63 and the program constant K is forwarded from register 95 via channel 73 to register 64. The contents of registers 63 and 64 are added in long add controls 57 and the result is forwarded back to register 81 via the RA and RB sections of a register 50. If the new address is in stack 77, the instruction may issue as heretofore described. If the new address is not in stack, the out-of-stack flag 100 is set and the instructions are called up from memory as heretofore described.

14. Jump to P + K If X*j* Is Or Is Not In Range — These instructions cause the program sequence to jump to P + K (as described in case 13) if X*j* is (or is not, as the instruction may dictate) in range. If the ranch condition does not exist, that is if X*j* is out of range (or in range, as the instruction may dictate), the processor ignores the instruction and continues with the current program address sequence. In this case the contents of the register designated by the *j* designator are examined for overflow (out of range) in any of three senses: fixed point overflow, floating point overflow, or divide by zero overflow, to determine the jump condition. A similar instruction may be provided for conditions where the contents of the X*j* register equals, or does not equal ± 0, or if the contents of the X*j* register is positive or negative.

15. Branch Backwords *i* Words If X*j* < X*k* — This instruction causes the current program sequence to terminate and branch backwards the number of words specified by the *i* designator if the contents of the register designated by the *j* designator is smaller than the contents of the register designated by the *k* designator. Specifically, the contents of the X*j* and X*k* registers are forwarded to registers 63 and 64 and subtracted. If X*j* – X*k* is positive, the branch condition is not satisfied and the current program address sequence continues. If X*j* – X*k* is negative, the branch condition is satisfied and *i* is subtracted from the program address P. After the new address P-*i* is obtained, the instruction issues as heretofore described in connection with in stack and out-of-stack addresses, whichever is the case.

16. Call Subroutine — A subroutine may be called at an address specified by the program constant (K) in register 95 or from registers 50 at a register designated by a k designation in the call instruction. In either case, the new address is transmitted to register 64 and is forwarded to register 81 through the RA AND RB section of registers 50 for operation on the circuitry shown in FIG. 3 as heretofore described. Similarly, library routines are called at addresses dictated by the program constant (K) or from data in the appropriate X*k* register.

17. Exits — These instructions terminate the current program sequence and initiates a new sequence. In subroutine and library routine exits a jump is accomplished to X*j* + K by adding the data in the register designated by the *j* designator of the instruction to the data carried by the program constant in register 95 and jumping to that address as heretofore described, particularly as described in case 14. An exchange exit instruction will cause the current program sequence to terminate with an exchange jump to the absolute address of the exchange package. In this case, no gate signal is provided from either the data storage reference group bit 111 or the program reference flag 110 (FIG. 3), so the reference address in register 113 is not added to the absolute address of the exchange package.

READ, STORE AND TRANSMIT

18. Store Data From X*j* — Data may be stored in memory 34 (via channel 99) from a register designated by the *j* designator of the store instruction. In such case, the address in memory where the data is to be stored is controlled in part by either the program constant (K) from register 95 or by the address stored in the register designed by the *k* designator of the instruction, whichever is desired. In either case, the storage address (K or X*k*) is routed through register 64, through the RA and RB section of registers 50, through register 81 and the circuitry shown in FIG. 3 to be added to the reference address in register 113 (gated by the data storage reference group bit 111). The combined address dictates the absolute address in memory for storage of data. Data from any of the 16 X registers 50 may be written into memory 34 using this process.

19. Store Data From X*i* — In these cases data may be stored from any X register 16 by designating that register with an *i* designator. The address of storage in memory 34 is formed by adding the contents of a register designated by a *j* designator to either a program constant (K) or the contents of a register designated by a *k* designator. The resultant address, which will be the absolute address of the storage location, is routed to the 00 X register, to exchange parameter word register 61 and then to reference address register 113 in FIG. 3. The absolute storage address in register 113 is then forwarded to storage access control 128 upon the gate signal provided by the data storage reference group bit.

20. Read Data To X*j* — In these cases data may be read into a register designated by the *j* designator from memory 34 via channel 65. The location in memory 65 of the originating data is determined by adding the reference address in register 113 to either the address specified by the program constant (K) in register 95 or from the contents of a register designated by a *k* designator, as heretofore described. It is possible to combine the instructions of this case 20 with those of case 18 to form a single instruction which enters a data word into a specified X*j* register from a program storage field address and to store the original contents of that X*j* register into memory at the same program storage field address.

21. Read Program To X*j* — These instructions enable reading of a data word from an absolute address in memory 34. The address may be derived from either the program constant (K) in register 95, or from the contents of a specified X*k* register, or from an address derived by adding K to the program address (P) in register 81, all as heretofore described. Unless the data storage reference group bit 111 is set, the reference address in register 113 will not be added to the address as derived.

22. Transmit To X*j* — It is possible to transmit various words to a register designated by a *j* register by routing the word through register 64. In this manner, the exchange address from register 61, the program constant K from register 95, an addition of the program constant and program address from register 81 or even a selected *k* designator may be stored in a selected X register.

PROGRAM EXECUTE

23. Copy X*k* To X*j* — In this case the word in the register designated by the designator is read through register 64 and copied into the register designated by the *j* register. If it is desired to complement the word, the word is complemented in complement circuit 69 before entering register 64.

24. Shift X*j* By X*k* — In this case, the word in the register designated by *j* is read to register 63 and the shift word in the register designated by *k* is read to register 64. A shift is performed (either left or right as dictated by the instruction code F) by shift controls 57 and the result is forwarded back to the register designated by the *j* designator.

25. Integer Shift X*j* By *n* — In this case the word in the register designated by the *j* designator is read into register 63 and *n* is read into register 64. In this case, the instruction format is as shown in case ii so that *n* is a 6-bit integer dictated by 2-bits from the *i* designator position and 4-bits from the *k* designator position of the instruction. A shift left or right is accomplished as described in case 24.

26. Blank Or Save *n* Bits Of X*j* — In this case, the word in the register designated by the *j* designator is read into register 63 and 1s are read into register 64 for *n* locations. For save operations, the 1s in register 64 gate the data in register 63 for storage in the X*j* register. For blank operations the 0s in register 64 gate the data in register 63 for storage in the X*j* register.

27. Population count X*k* To X*j* — This instruction reads an operand from a register 50 designated by the designator into register 64, counts the number of 1 bits in the operand in the Boolean circuits 57, and enters the count into a register 50 designated by the *j* designator. In this case if X*k* contains all 64 1 bits, the count entered into X*j* is decimal 64 (0100 0000); if X*k* contains all 0 bits, the count entered into X*j* is 0.

Figure 8:
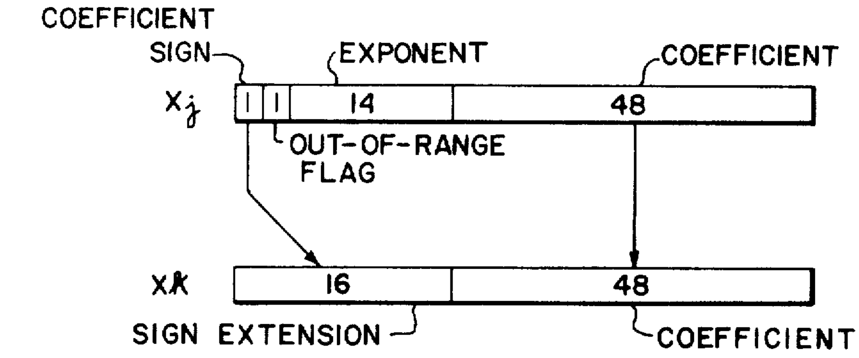
FIGS. 8 – 10 are representations of pack and unpack operations for floating point format.

28. Unpack Coefficient Of X*j* To X*k* — This instruction reads a 64-bit floating point operand from an X register 50 designated by *j* to register 63 for unpacking by the unpack controls (not shown) and the 48-bit coefficient and a 16-bit coefficient sign extension are entered into the X register 50 designated by *k*. See FIG. 8.

Figure 9:
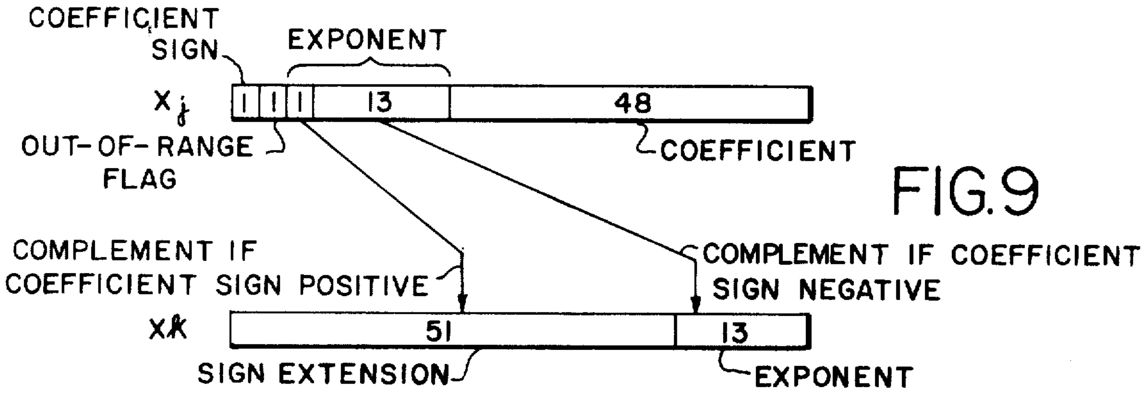

29. Unpack Exponent Of X*j* to X*k* — This instruction reads a 64-bit floating point operand from an X register designated by *j* to register 63 for unpacking as described in case 29 and as shown in FIG. 9. The exponent of the operand is sign extended and entered into the X*k* register. If X*j* is positive, the complement of the most significant bit of the exponent is copied into X*k*. If X*j* is negative, the complement of the 12 least significant bits of the exponent is copied into X*k*.

Figure 10:
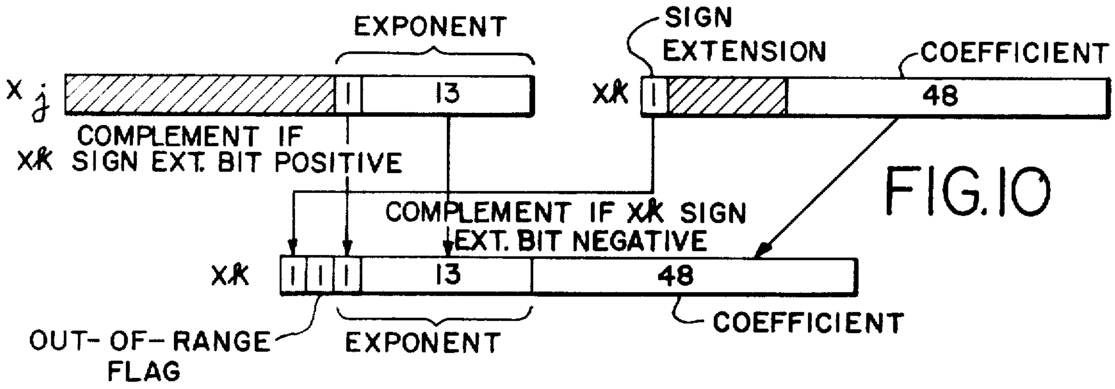

30. Pack Coefficient X*k* And Exponent X*j* to X*k* — This instruction reads a coefficient operand from the X*k* register 50 to register 64 and an exponent operand from the X*j* register 50 to register 63, packs them into a 64-bit floating point word, and enters the result into the X*k* register 50. See FIG. 10. Note that the 13 least significant bits of the exponent are complemented if the X*k* sign extension bit is negative, whereas the most significant bit of the exponent is complemented if the X*k* sign extension bit is positive. The out-of-range flag in the result is set to the sign bit. To normalize the result, this instruction may be followed by a floating point add instruction adding this result to zero. See case 5.

31. Monitor Mode — This is a system condition wherein a processor in a monitor mode (having a monitor mode flag set) may set a system call flag causing an exchange of all processors not in the monitor made to exchange to their exchange addresses in their register 103. The condition is ended by a clear of the system mode flag. During this exchange condition, a block of data arriving on an I/O channel is stored in consecutive address location in memory 34 beginning at an absolute address dictated by an X*k* data word. The data block may consist of one or more words, the length of which is dictated by channel selection. Partially assembled 64-bit words are filled out with zeros. Likewise, an appropriate output instruction may be issued causing a block of data to be read out of memory on an I/O channel.

32. Interrupt Flags — Any or all of the 20 bits of the interlock register 40 may be set or cleared from the lower 20 bits of an X register designated by a *k* designator. To set the interlock register, the 1s in the X*k* register set corresponding bits in the interlock register. To clear the interlock register the 1s in the X*k* register clear corresponding bits in the interlock register, the 0s in the X*k* register not affecting bits set in the interlock register. The interlock register contents may be read into any register 50 designated by a *j* designator.

33. Read Clock To X*j* — This instruction, used for determining elapsed time between selected points in program execution, is accomplished by reading the current contents of the internal real time clock (not shown) into the upper 44 bits of X register designated by a *j* designator.

SUMMARY

The present invention thus provides a multiprocessor computer system wherein each processor contains a plurality of universal registers capable of operating in any one of a plurality of modes, and wherein an interlock control is provided for forwarding data and process control signal between processors without passing through memory. One feature of the present invention also resides in the memory access technique accomplished by combining a reference address of an object program and an exchange jump address to derive the absolute address of data to be retrieved. The system also is capable of operating directly on an absolute address, thereby ignoring the object program reference address.

With respect to the addressing technique accomplished by the apparatus shown particularly in FIG. 3, assume that an object program has an absolute reference address $RA_R$, designating a particular location in memory 34 as graphically illustrated in FIG. 4. Assume further other sections of the memory contain resident library routines (having an absolute address of LA) and a subroutine having an absolute address SA. With reference to FIG. 3, the object program reference address (RA) is always contained in register 113. This address, for example, will be the absolute address of the beginning location of the object program. When it is desired to call up instructions from memory (such as in an out-of-stack, library call, or exchange jump situations, or where a read or write function is to occur), the reference address (RA) plus the count advanced from select circuit 106 is the address forwarded to the memory. For example, for out-of-stack instructions, the program address is incremented through register 105 and circuit 114 to advance the court in select circuit 106. Thus, if the first program address is 0000, that count is incremented through 0001, 0010, 0011, etc., is added to the reference address (RA) and forwarded to memory 34 to retrieve successive instructions of the object program. Likewise, in jump situations, register 105 is loaded with a code indicative of the relative address of the exchange package to the object program. These addresses are added together to form the absolute address of the exchange package subroutine (SA). However, in so far as the processor "sees" from the data, only the relative address of the exchange package is used — that is, that address value indicative of how far removed the object program and the subroutine are displaced in memory 34. However, when calling a resident library, the absolute address of the library is loaded into register 105 and is passed directly to memory (as incremented for successive instructions). In this case, the reference address is not added to the address sent to memory.

The universal aspects of registers 50 are accomplished by the fact that registers 50 are the only registers accessible by the programmer-operator, and they may be used for any of several functions, depending on how they are accessed. Further, it is permissable to utilize some of the registers for indexing, some for addressing and some for arithmetic accumulation, all simultaneously.

The present invention thus provides a computer system capable of memory access, indexing and accumulation in a minimal amount of time, while exploiting the capabilities of the individual components to a maximum degree of efficiency. Further, by maximum exploitation of the components of the system, the overall size of the system may be smaller than could be heretofore achieved.

This invention is not to be limited by the embodiment shown in the drawings and described in the description, which is given by way of example and not of limitation, but only in accordance with the scope of the appended claims.

What is claimed is:

1. In a data processor having logic means for accomplishing binary logic operations on data, instruction issuing means for issuing process instructions for manipulating data, and accumulator means for accomplishing arithmetic operations on data, the improvement comprising:

register means for storing data, said register means comprising a plurality of individually addressable portions;

merge network means connected to said register means and to said logic means and said accumulator means for selectively writing data into addressed portions of said register means from said logic means and said accumulator means;

distribution network means connected to said register means and to said logic means and said accumulator means for selectively reading data out of addressed portions of said register means to said logic means and said accumulator means; and control means connected to said instruction issuing means and to said merge network means and said distribution network means and responsive to said process instructions for selectively operating said merge network means to write data into selected register portions from selected logic means and accumulator means, and for selectively operating said distribution network means to read data from selected register portions to selected logic means and accumulator means.

2. Apparatus according to claim 1 wherein said logic means includes means for accomplishing shift, long addition, Boolean logic, masking, floating point pack and floating point un-pack operations, said apparatus further including first and second operand register means connected between said logic means and said distribution network means, said control means being operable to selectively operate said distribution network means to read data from selected register portions to selected ones of said operand register means.

3. Apparatus according to claim 1 wherein said merge network means and said distribution network means are connected to a memory means, said control means being operable in response to said process instructions to selectively operate said merge network means to write data into selected register portions from said memory means and to selectively operate said distribution network to read data from selected register portions into said memory means.

4. Apparatus according to claim 3 wherein said logic means includes means for accomplishing shift, long addition, Boolean logic, masking, floating point pack and floating point un-pack operations, said apparatus further including first and second operand register means connected between said logic means and said distribution network means, said control means being operable to selectively operate said distribution network means to read data from selected register portions to selected ones of said operand register means.

5. Apparatus according to claim 3 wherein said control means includes instruction word storage means and instruction address storage means, said instruction word storage means being adapted to receive process instructions from said memory, said instruction address storage means being connected to said register means to receive instruction addresses from selected portions of said register means, said instruction address storage means being operable in response to an instruction address to cause an output of a corresponding process instruction from said instruction word storage means, and translator means responsive to an instruction word from said instruction word storage means for selectively operating said distribution network means and said merge network means.

6. Apparatus according to claim 5 wherein said logic means includes means for accomplishing shift, long addition, Boolean logic, masking, floating point pack and floating point un-pack operations, said apparatus further including first and second operand register means connected between said logic means and said distribution network means, said control means being operable to selectively operate said distribution network means to read data from selected register portions to selected ones of said operand register means.

7. Apparatus according to claim 6 further including means for transferring at least a portion of said instruction addresses to a selected one of said operand register means.

8. Apparatus according to claim 7 further including means for transferring at least a portion of said process instructions to a selected one of said operand registers.

9. Apparatus according to claim 6 further including means for transferring at least a portion of said process instructions to a selected one of said operand registers.

10. Apparatus according to claim 3 further including instruction word register means adapted to receive instruction words from said memory means for controlling data processing operations, memory access control means for conditioning said memory means to transmit instruction words to said instruction word register means in accordance with predetermined access addresses, address means connected to said memory access control means for generating said predetermined access addresses, said address means including program address register means providing a program address indicative of individual data processing instructions of an object program; reference address register means providing a reference address unique to said object program; second control means responsive to said reference address and to said program address for adding said reference address to at least a portion of said program address; and gate means for selectively operating said second control means.

11. Apparatus according to claim 10 wherein each program address is unique to an individual instruction of said object program and is referenced from said reference address, first increment means for incrementally altering said program address to provide successive, incremental program addresses, whereby upon operation of said gate means, said second control means operates to form said predetermined access addresses by combining said reference address and at least a portion of each successive program address.

12. Apparatus according to claim 11 further including exchange address register means providing a resident program address representative of an address of a program stored in said memory means outside of the field length of said object program, second increment means for incrementally increasing said resident program address to supply successive, incremental resident program addresses, said gate means being operable to condition said second control means to pass said successive resident program addresses to said memory access control means.

13. Apparatus according to claim 12 wherein said second control means includes adder means having first and second inputs for binarily adding binary signals appearing at said first and second inputs, means for applying said incremental program addresses to the first input of said adder means, said gate means including AND gate means having first and second inputs and an output, means connecting the output of said AND gate means to the second input of said adder means, means for applying said reference address to the first input of said AND gate means, and select means for selectively applying an enable signal to the second input of said AND gate means.

14. Apparatus according to claim 13 wherein said select means includes issue means associated with said instruction word register means for issuing said enable signal upon issuance of an individual instruction of said object program.

15. Apparatus according to claim 13 wherein said select means includes exchange means providing an exchange address representative of the relative location in said memory means of an exchange program routine outside of the field length of said object program, said exchange address being relative to said reference address, said second control means being responsive to said reference address and said exchange address to add said reference address to at least a portion of said exchange address upon operation of said AND gate means, said exchange means providing said enable signal to said AND gate means upon issuance of an exchange program by said instruction word register means.

16. Apparatus according to claim 15 wherein said select means further includes issue means associated with said instruction word register means for issuing an enable signal upon issuance of an individual instruction of said object program, and OR gate means connected to said issue means and to said exchange means for applying the enable signals from said issue means and from said exchange means to the second input of said AND gate means.

17. Apparatus according to claim 10 wherein said second control means includes adder means having first and second inputs for binarily adding binary signals appearing at said first and second inputs, means for applying said program addresses to the first input of said adder means, said gate means including AND gate means having first and second inputs and an output, means connecting the output of said AND gate means to the second input of said adder means, means for applying said reference address to the first input of said AND gate means, and select means for selectively applying an enable signal to the second input of said AND gate means.

18. Apparatus according to claim 17 wherein said select means includes issue means associated with said instruction word register means for issuing said enable signal upon issuance of an individual instruction of said object program.

19. Apparatus according to claim 17 wherein said select means includes exchange means providing an exchange address representative of the relative location in said memory means of an exchange program routine outside of the field length of said object program, said exchange address being relative to said reference address, said second control means being responsive to said reference address and said exchange address to add said reference address to at least a portion of said exchange address upon operation of said AND gate means, said exchange means providing said enable signal to said AND gate means upon issuance of an exchange program by said instruction word register means.

20. Apparatus according to claim 19 wherein said select means further includes issue means associated with said instruction word register means for issuing an enable signal upon issuance of an individual instruction of said object program, and OR gate means connected to said issue means and to said exchange means for applying the enable signals from said issue means and from said exchange means to the second input of said AND gate means.

21. Apparatus according to claim 10 wherein said processor further includes address stack means connected to said program address register means and containing one or more program addresses associated with instruction words stored in said instruction word register means, and means for applying data from said register means to said program address register means, said improvement further including out-of-stack means responsive to a non-coincidence between the data in said program address register means and the addresses in said address stack means for providing an enable signal, first select means responsive to said enable signal from said out-of-stack means for accepting data from said program address register means, said last-named data comprising first and second pluralities of bits, said second control means including first adder means connected to said first select means for receiving said first plurality of bits, said first adder means being operable in response to operation of said gate means to binarily add said reference address to said first plurality of bits, said access control means being connected to said first select means and to said first adder means to receive the output from said adder means and said second plurality of bits.

22. Apparatus according to claim 21 further including instruction fetch address means operable to receive data from said program address register means to forward said data to said first select means, and increment means for incrementally altering data in said instruction fetch address means to provide successive, incremental data.

23. Apparatus according to claim 22 further including exchange means providing an exchange address representative of the relative location in said memory means of an exchange routine outside of the field length of said object program, said exchange address being relative to said reference address, second select means responsive to said out-of-stack means for transferring said exchange address from said exchange means to said instruction fetch address means, incremental counter means associated with said exchange means for counting the number of transfers of data from said exchange means to said instruction fetch address means, and second adder means for adding the count in said counter means to data in said instruction fetch address means.

24. Apparatus according to claim 23 wherein said gate means includes an AND gate means having a first input connected to said reference address register means and a second input connected to receive an enable signal, said exchange means providing an enable signal for said AND gate.

25. Apparatus according to claim 24 wherein said gate means further includes OR gate means having a first input connected to receive an enable signal from said exchange means and having an output connected to the second input of said AND gate means, issue control means associated with said instruction word register means for issuing enable signals upon issuance of instructions of said object program, and means connecting the second input of said OR gate means to receive enable signals from said issue control means.

26. In a data processor having an instruction word register means adapted to receive instruction words from a memory means for controlling data processing operations and having memory access control means for conditioning said memory means to transmit instruction words to said instruction word register means in accordance with predetermined access addresses, the improvement comprising address means connected to said memory access control means for generating said predetermined access addresses, said address means including program address register means providing a program address indicative of individual data processing instructions of an object program;

reference address register means providing a reference address unique to said object program, each of said program addresses being referenced from said reference address;

control means responsive to said reference address and to said program address for adding said reference address to at least a portion of said program address;

gate means for selectively operating said control means;

first increment means for incrementally altering said program address to provide successive, incremental program addresses, whereby upon operation of said gate means, said control means operates to form said predetermined access addresses by combining said reference address and at least a portion of each successive program address;

exchange address register means providing a resident program address representative of an address of a program stored in said memory means outside of the field length of said object program; and second increment means for incrementally increasing said resident program address to supply successive, incremental resident program addresses, said gate means being operable to condition said control means to pass said successive resident program addresses to said memory access control means.

27. Apparatus according to claim 26 wherein said control means includes adder means having first and second inputs for binarily adding binary signals appearing at said first and second inputs, means for applying said incremental program addresses to the first input of said adder means, said gate means including AND gate means having first and second inputs and an output, means connecting the output of said AND gate means to the second input of said adder means, means for applying said reference address to the first input of said AND gate means, and select means for selectively applying an enable signal to the second input of said AND gate means.

28. Apparatus according to claim 27 wherein said select means includes issue means associated with said instruction word register means for issuing said enable signal upon issuance of an individual instruction of said object program.

29. Apparatus according to claim 27 wherein said select means includes exchange means providing an exchange address representative of the relative location in said memory means of an exchange program routine outside of the field length of said object program, said exchange address being relative to said reference address, said control means being responsive to said reference address and said exchange address to add said reference address to at least a portion of said exchange address upon operation of said AND gate means, said exchange means providing said enable signal to said AND gate means upon issuance of an exchange program by said instruction word register means.

30. Apparatus according to claim 29 wherein said select means further includes issue means associated with said instruction word register means for issuing an enable signal upon issuance of an individual instruction of said object program, and OR gate means connected to said issue means and to said exchange means for applying the enable signals from said issue means and from said exchange means to the second input of said AND gate means.

31. In a data processor having an instruction word register means adapted to receive instruction words from a memory means for controlling data processing operations and having memory access control means for conditioning said memory means to transmit instruction words to said instruction word register means in accordance with predetermined access addresses, the improvement comprising address means connected to said memory access control means for generating said predetermined access addresses, said address means including program address register means providing a program address indicative of individual data processing instructions of an object program;

reference address register means providing a reference address unique to said object program;

control means responsive to said reference address and to said program address for adding said reference address to at least a portion of said program address, said control means including adder means having first and second inputs for binarily adding binary signals at said first and second inputs, and means for applying said program addresses to the first input of said adder means;

gate means for selectively operating said control means, said gate means including AND gate means having first and second inputs and an output, means connecting the output of said AND gate means to the second input of said adder means, and means for applying said reference address to the first input of said AND gate means; and select means for selectively applying an enable signal to the second input of said AND gate means, said select means including exchange means providing an exchange address representative of the relative location in said memory means of an exchange program routine outside of the field length of said object program, said exchange address being relative to said reference address, said control means being responsive to said reference address and to said exchange address to add said reference address to at least a portion of said exchange address upon operation of said AND gate means, said exchange means providing said enable signal to said AND gate means upon issuance of an exchange program by said instruction word register means.

32. Apparatus according to claim 31 wherein said select means further includes issue means associated with said instruction word register means for issuing an enable signal upon issuance of an individual instruction of said object program, and OR gate means connected to said issue means and to said exchange means for applying the enable signals from said issue means and from said exchange means to the second input of said AND gate means.

33. In a data processor having an instruction word register means adapted to receive instruction words from a memory means for controlling data processing operations, memory access control means for conditioning said memory means to transmit instruction words to said instruction word register means in accordance with predetermined access addresses, the improvement comprising address means connected to said memory access control means for generating said predetermined access addresses, said address means including program address register means providing a program address indicative of individual data processing instructions of an object program;

address stack means connected to said program address register means and containing one or more program addresses associated with instruction words stored in said instruction word register means, X register means in said processor for storing data, and means for applying data from said X register means to said program address register means, reference address register means providing a reference address unique to said object program;

out-of-stack means responsive to a non-coincidence between the data in said program address register means and the addresses in said address stack means for providing an enable signal;

first select means responsive to said enable signal from said out-of-stack means for accepting data from said program address register means, said last-named data comprising first and second pluralities of bits;

control means responsive to said reference address and to said program address for adding said reference address to at least a portion of said program address, said control means including first adder means connected to said first select means for receiving said first plurality of bits, said access control means being connected to said first select means and said first adder means to receive the output from said adder means and said second plurality of bits; and gate means for selectively operating said control means, said first adder means being operable in response to operation of said gate means to binarily add said reference address to said first plurality of bits.

34. Apparatus according to claim 33, further including instruction fetch address means operable to receive data from said program address register means to forward said data to said first select means, and increment means for incrementally altering data in said instruction fetch address means to provide successive, incremental data.

35. Apparatus according to claim 34 further including exchange means providing an exchange address representative of the relative location in said memory means of an exchange routine outside of the field length of said object program, said exchange address being relative to said reference address, second select means responsive to said out-of-stack means for transferring said exchange address from said exchange means to said instruction fetch address means, incremental counter means associated with said exchange means for counting the number of transfers of data from said exchange means to said instruction fetch address means, and second adder means for adding the count in said counter means to data in said instruction fetch address means.

36. Apparatus according to claim 35 wherein said gate means includes an AND gate means having a first input connected to said reference address register means and a second input connected to receive an enable signal, said exchange means providing an enable signal for said AND gate.

37. Apparatus according to claim 36 wherein said gate means further includes OR gate means having a first input connected to receive an enable signal from said exchange means and having an output connected to the second input of said AND gate means, issue control means associated with said instruction word register means for issuing enable signals upon issuance of instructions of said object program, and means connecting the second input of said OR gate means to receive enable signals from said issue control means.

38. In a multiprocessor computer system having:

a. a plurality of individual data processors, each of said processors having:
   i. logic means for accomplishing binary logic operations on data,
   ii. instruction issuing means for issuing process instructions for manipulating data,
   iii. accumulator means for accomplishing arithmetic operations on data,
   iv. register means for storing data, said register means comprising a plurality of individually addressable register portions,
   v. merge network means connected to said register means and to said logic means and to said accumulator means for selectively writing data into addressed portions of said register means from said logic means and said accumulator means,
   vi. distribution network means connected to said register means and to said logic means and to said accumulator means for selectively reading data out of addressed portions of said register means to said logic means and said accumulator means, and
   vii. first control means connected to said instruction issuing means and to said merge network means and to said distribution network means and responsive to said process instructions for selectively operating said merge network means to write data into selected register portions from selected logic means and selected accumulator means, and for selectively operating said distribution network to read data from selected register portions to selected logic means and selected accumulator means;

b. memory means common to each of said data processors and connected to ech of said first control means;

c. input/output means operatively associated with said memory means;

the improvement comprising:

d. interlock register means having an output connected to each of said merge network means and having an input connected to each of said distribution network means; and e. second control means associated with each of said data processors and connected to said interlock register means, said second control means being operable in response to process instructions to selectively read binary coded information from selected register portions of the respective register means to said interlock register means and being further operable in response to process instructions to selectively write binary coded information into selected register portions of the respective register means from said interlock register means.

39. Apparatus according to claim 38 wherein said merge network means and said distribution network means are connected to said memory means, said first control means being operable in response to said process instruction to selectively operate said merge network means to write data into selected register portions from said memory means and to selectively operate said distribution network to read data from selected register portions into said memory means.

40. Apparatus according to claim 39 wherein said first control means includes instruction word storage means and instruction address storage means, said instruction word storage means being adapted to receive process instructions from said memory, said instruction address storage means being connected to said register means to receive instruction addresses from selected portions of said register means, said instruction address storage means being operable in response to an instruction address to cause an output of a corresponding process instruction from said instruction word storage means, and translator means responsive to an instruction word from said instruction word storage means for selectively operating said distribution network means and said merge network means.

41. Apparatus according to claim 40 wherein said logic means includes means for accomplishing shift, long addition, Boolean logic, masking, floating point pack and floating point un-pack operations, said apparatus further including first and second operand register means connected between said logic means and said distribution network means, said first control means being operable to selectively operate said distribution network means to read data from selected register portions to selected ones of said operand register means.

42. Apparatus according to claim 40 further including means for transferring at least a portion of said instruction addresses to a selected one of said operand register means.

43. Apparatus according to claim 42 further including means for transferring at least a portion of said process instructions to a selected one of said operand registers.

44. Apparatus according to claim 40 further including means for transferring at least a portion of said process instructions to a selected one of said operand registers.

45. Apparatus according to claim 40 wherein said first named control means is connected to said translator means and responsive to the output therefrom.

46. Apparatus according to claim 40 wherein each processor further includes memory access control means for conditioning said memory means to transmit process instructions to said instruction word storage means in accordance with predetermined access addresses, address means connected to said memory access control means for generating said predetermined access addresses, said address means including program address register means providing a program address indicative of individual data processing instructions of an object program, reference address register means providing a reference address unique to said object program, third control means responsive to said reference address and to said program address for adding said reference address to at least a portion of said program address; and gate means for selectively operating said third control means.

47. Apparatus according to claim 46 wherein each program address is unique to individual instruction of said object program and is referenced from said reference address, first increment means for incrementally altering said program address to provide successive, incremental program addresses, whereby upon operation of said gate means, said third control means operates to form said predetermined access addresses by combining said reference address and at least a portion of each successive program address.

48. Apparatus according to claim 47 further including exchange address register means providing a resident program address representative of an address of a program stored in said memory means outside of the field length of said object program, second increment means for incrementally increasing said resident program address to supply successive, incremental resident program addresses, said gate means being operable to condition said third control means to pass said successive resident program addresses to said memory access control means.

49. Apparatus according to claim 48 wherein said third control means includes adder means having first and second inputs for binarily adding binary signals appearing at said first and second inputs, means for applying said incremental program addresses to the first input of said adder means, said gate means including AND gate means having first and second inputs and an output, means connecting the output of said AND gate means to the second input of said adder means, means for applying said reference address to the first input of said AND gate means, and select means for selectively applying an enable signal to the second input of said AND gate means.

50. Apparatus according to claim 49 wherein said select means includes said translator means for issuing said enable signal upon issuance of an individual instruction of said object program from said instruction word storage means.

51. Apparatus according to claim 49 wherein said select means includes exchange means providing an exchange address representative of the relative location in said memory means of an exchange program routine outside of the field length of said object program, said exchange address being relative to said reference address, said third control means being responsive to said reference address and said exchange address to add said reference address to at least a portion of said exchange address upon operation of said AND gate means, said exchange means providing said enable signal to said AND gate means upon issuance of an exchange program by said instruction word storage means.

52. Apparatus according to claim 51 wherein said select means further includes said translator means for issuing an enable signal upon issuance of an individual instruction of said object program from said instruction word storage means, and OR gate means connected to said issue means and to said exchange means for applying the enable signals from said issue means and from said exchange means to the second input of said AND gate means.

53. Apparatus according to claim 46, wherein said third control means includes adder means having first and second inputs for binarily adding binary signals appearing at said first and second inputs, means for applying said program addresses to the first input of said adder means, said gate means including AND gate means having first and second inputs and an output, means connecting the output of said AND gate means to the second input of said adder means, means for applying said reference address to the first input of said AND gate means, and select means for selectively applying an enable signal to the second input of said AND gate means.

54. Apparatus according to claim 53 wherein said select means includes issue means associated with said instruction word register means for issuing said enable signal upon issuance of an individual instruction of said object program.

55. Apparatus according to claim 53 wherein said select means includes exchange means providing an exchange address representative of the relative location in said memory means of an exchange program routine outside of the field length of said object program, said exchange address being relative to said reference address, said third control means being responsive to said reference address and said exchange address to add said reference address to at least a portion of said exchange address upon operation of said AND gate means, said exchange means providing said enable signal to said AND gate means upon issuance of an exchange program by said instruction word register means.

56. Apparatus according to claim 55 wherein said select means further includes issue means associated with said instruction word register means for issuing an enable signal upon issuance of an individual instruction of said object program, and OR gate means connected to said issue means and to said exchange means for applying the enable signals from said issue means and from said exchange means for applying the enable signals from said issue means and from said exchange means to the second input of said AND gate means.

57. Apparatus according to claim 46 wherein each of said data processors further include address stack means connected to said program address register means and containing one or more program addresses associated with instruction words stored in said instruction word register means, and means for applying data from said register means to said program address register means, out-of-stack means responsive to a non-coincidence between the data in said program address register means and the addresses in said address stack means for providing an enable signal, first select means responsive to said enable signal from said out-of-stack means for accepting data from said program address register means, said last-named data comprising first and second pluralities of bits, said third control means including first adder means connected to said first select means for receiving said first plurality of bits, said first adder means being operable in response to operation of said gate means to binarily add said reference address to said first plurality of bits, said access control means being connected to said first adder means to receive the output from said adder means and said second plurality of bits.

58. Apparatus according to claim 57 further including instruction fetch address means operable to receive data from said program address register means to forward said data to said first select means, and increment means for incrementally altering data in said instruction fetch address means to provide successive, incremental data.

59. Apparatus according to claim 58 further including exchange means providing an exchange address representative of the relative location in said memory means of an exchange routine outside of the field length of said object program, said exchange address being relative to said reference address, second select means responsive to said out-of-stack means for transferring said exchange address from said exchange means to said instruction fetch address means, incremental counter means associated with said exchange means for counting the number of transfers of data from said exchange to said instruction fetch address means, and second adder means for adding the count in said counter means to data in said instruction fetch address means.

60. Apparatus according to claim 59 wherein said gate means includes an AND gate means having a first input connected to said reference address register means and a second input connected to receive an enable signal, said exchange means providing an enable signal for said AND gate.

61. Apparatus according to claim 60 wherein said gate means further includes OR gate means having a first input connected to receive an enable signal from said exchange means and having an output connected to the second input of said AND gate means, issue control means associated with said instruction word register means for issuing enable signals upon issuance of instructions of said object program, and means connecting the second input of said OR gate means to receive enable signals from said issue control means.

62. In a multiprocessor computer system having:

a. memory means;

b. a plurality of individual data processors connected to said memory means, said data processors having:

i. register means for storing data, said register means comprising a plurality of individually addressable register portions, ii. logic means connected to said register means for performing arithmetic, addressing and indexing functions, iii. instruction word register means adapted to receive instruction words from said memory means, iv. first control means responsive to instruction words from said instruction word register means for selectively operating said register portions to selectively read binary coded information from selected register portions to said logic means, and to selectively write binary coded information into selected register portions from said logic means, v. memory access control means for conditioning said memory means to transmit instruction words to said instruction word register means in accordance with predetermined access addresses, and vi. address means connected to said memory access control means for generating said predetermined access addresses, said address means including program address register means providing a program address indicative of individual data processing instructions of an object program, reference address register means providing a reference address unique to said object program, each program address being unique to an individual instruction of said object program and referenced from said reference address, second control means responsive to said reference address and to said program address for adding said reference address to at least a portion of said program address, exchange address register means providing a resident program address representative of an address of a program stored in said memory means outside of the field length of said object program, first increment means for incrementally altering said program address to provide successive, incremental program addresses, second increment means for incrementally increasing said resident program address to supply successive, incremental resident program addresses, and gate means for selectively conditioning said second control means to form said predetermined access addresses by combining said reference address and at least a portion of each successive program address and to pass said successive resident program address to said memory access control means, and c. input/output means operatively associated with said memory means;

the improvement comprising:

d. interlock register means having an output connected to an input of each of said first-named register means and having an input connected to an output of each of said first-named register means; and e. third control means associated with each of said data processors and connected to said interlock register means, said third control means being operable in response to process instructions from said first control means to selectively read binary coded information from selected register portions of the respective first-named register means to said interlock register means and being further operable in response to process instructions from said first control means to selectively write binary coded information into selected register portions of the respective first-named register means from said interlock register means.

63. Apparatus according to claim 62 wherein said second control means includes adder means having first and second inputs for binarily adding binary signals appearing at said first and second inputs, means for applying said incremental program addresses to the first input of said adder means, said gate means including AND gate means having first and second inputs and an output, means connecting the output of said AND gate means to the second input of said adder means, means for applying said reference address to the first input of said AND gate means, and select means for selectively applying an enable signal to the second input of said AND gate means.

64. Apparatus according to claim 63 wherein said select means includes issue means associated with said instruction word register means for issuing said enable signal upon issuance of an individual instruction of said object program.

65. Apparatus according to claim 63 wherein said select means includes exchange means providing an exchange address representative of the relative location in said memory means of an exchange program routine outside of the field length of said object program, said exchange address being relative to said reference address, said second control means being responsive to said reference address and said exchange address to add said reference address to at least a portion of said exchange address upon operation of said AND gate means, said exchange means providing said enable signal to said AND gate means upon issuance of an exchange program by said instruction word register means.

66. Apparatus according to claim 65 wherein said select means further includes issue means associated with said instruction word register means for issuing an enable signal upon issuance of an individual instruction of said object program, and OR gate means connected to said issue means and to said exchange means for applying the enable signals from said issue means and from said exchange means to the second input of said AND gate means.

67. In a multiprocessor system having:

a. memory means;

b. a plurality of individual data processors connected to said memory means, said data processors having:

i. register means for storing data, said register means comprising a plurality of individually addressable register portions, ii. logic means connected to said register means for performing arithmetic, addressing and indexing functions, iii. instruction word register means adapted to receive instruction words from said memory means, iv. first control means responsive to instruction words from said instruction word register means for selectively operating said register portions to selectively read binary coded information from selected register portions to said logic means, and to selectively write binary coded information into selected register portions from said logic means, v. memory access control means for conditioning said memory means to transmit instruction words to said instruction word register means in accordance with predetermined access addresses, vi. address means connected to said memory access control means for generating said predetermined access addresses, said address means including:

program address register means providing a program address indicative of individual data processing instructions of an object program, reference address register means providing a reference address unique to said object program, second control means responsive to said reference address and to said program address for adding said reference address to at least a portion of said program address, said second control means including adder means having first and second inputs for binarily adding binary signals appearing at said first and second inputs, and means for applying said program addresses to the first input of said adder means, and gate means for selectively operating said second control means, said gate means including AND gate means having first and second inputs and an output, means connecting the output of said AND gate means to the second input of said adder means, means for applying said reference address to the first input of said AND gate means, and vii. select means for selectively applying an enable signal to the second input of said AND gate means, said select means including exchange means providing an exchange address representative of the relative location in said memory means of an exchange program routine outside of the field length of said object program, said exchange address being relative to said reference address, said second control means being responsive to said reference address and said exchange address to add said reference address to at least a portion of said exchange address upon operation of said AND gate means, said exchange means providing said enable signal to said AND gate means upon issuance of an exchange program by said instruction word register means; and c. input/output means operatively associated with said memory means;

the improvement comprising:

d. interlock register means having an output connected to an input of each of said first-named register means and having an input connected to an output of each of said first-named register means; and e. third control means associated with each of said data processors and connected to said interlock register means, said third control means being operable in response to process instructions from said first control means to selectively read binary coded information from selected register portions of the respective first-named register means to said interlock register means and being further operable in response to process instructions from said first control means to selectively write binary coded information into selected register portions of the respective first-named register means from said interlock register.

68. Apparatus according to claim 67 wherein said select means further includes issue means associated with said instruction word register means for issuing an enable signal upon issuance of an individual instruction of said object program, and OR gate means connected to said issue means and to said exchange means for applying the enable signals from said issue means and from said exchange means to the second input of said AND gate means.

69. In a multiprocessor computer system having:

a. memory means;

b. a plurality of individual data processors connected to said memory means, said data processors having:

i. X register means for storing data, said register means comprising a plurality of individually addressable register portions, ii. logic means connected to said register means for performing arithmetic, addressing and indexing functions, iii. instruction word register means adapted to receive instruction words from said memory means, iv. first control means responsive to instruction words from said instruction word register means for selectively operating said register portions to selectively read binary coded information from selected register portions to said logic means, and to selectively write binary coded information into selected register portions from said logic means, v. memory access control means for conditioning said memory means to transmit instruction words to said instruction word register means in accordance with predetermined access addresses, vi. address means connected to said memory access control means for generating said predetermined access addresses, said address means including program address register means providing program address indicative of individual data processing instructions of an object program, reference address register means providing a reference address unique to said object program, second control means responsive to said reference address and to said program address for adding said reference address to at least a portion of said program address, and gate means for selectively operating said second control means;

vii. address stack means connected to said program address register means and containing one or more program addresses associated with instruction words stored in said instruction word register means, and means for applying data from said X register means to said program address register means;

viii. out-of-stack means responsive to a non-coincidence between the data in said program address register means and the addresses in said address stack means for providing an enable signal; and ix. first select means responsive to said enable signal from said out-of-stack means for accepting data from said program address register means, said last-named data comprising first and second plurality of bits, said second control means including first adder means connected to said first select means for receiving said first plurality of bits, said first adder means being operable in response to operation of said gate means to binarily add said reference address to said first plurality of bits, said access control means being connected to said first adder means to receive the output from said adder means to receive the output from said adder means and said second plurality of bits; and c. input/output means operatively associated with said memory means;

the improvement comprising:

d. interlock register means having an output connected to an input of each of said first-named register means and having an input connected to an output of each of said first-named register means; and e. third control means associated with each of said data processors and connected to said interlock register means, said third control means being operable in response to process instructions from said first control means to selectively read binary coded information from selected register portions of the respective firstnamed register means to said interlock register means and being further operable in response to process instructions from said first control means to selectively write binary coded information into selected register portions of the respective first-named register means from said interlock register means.

70. Apparatus according to claim 59 further including instruction fetch address means operable to receive data from said program address register means to forward said data to said first select means, and increment means for incrementally altering data in said instruction fetch address means to provide successive, incremental data.

71. Apparatus according to claim 70 further including exchange means providing an exchange address representative of the relative location in said memory means of an exchange routine outside of the field length of said object program, said exchange address being relative to said reference address, second select means responsive to said out-of-stack means for transferring said exchange address from said exchange means to said instruction fetch address means, incremental counter means associated with said exchange means for counting the number of transfers of data from said exchange means to said instruction fetch address means, and second adder means for adding the count in said counter means to data in said instruction fetch address means.

72. Apparatus according to claim 71 wherein said gate means includes an AND gate means having a first input connected to said reference address register means and a second input connected to receive an enable signal, said exchange means providing an enable signal for said AND gate.

73. Apparatus according to claim 72 wherein said gate means further includes OR gate means having a first input connected to receive an enable signal from said exchange means and having an output connected to the second input of said AND gate means, issue control means associated with said instruction word register means for issuing enable signals upon issuance of instructions of said object program, and means connecting the second input of said OR gate means to receive enable signals from said issue control means.

* * * * *

UNITED STATES PATENT OFFICE
CERTIFICATE OF CORRECTION

Patent No. 3,833,889 Dated September 12, 1974

Inventor(s) Seymour R. Cray

It is certified that error appears in the above-identified patent and that said Letters Patent are hereby corrected as shown below:

Col. 1, line 31, for "program address" read --indexing--; Col. 1, line 62, for "mean" read --means--; Col. 2, line 28, for "operation" read --operations--; Col. 2, line 53, for "a" read --to--; Col. 4, line 36, for "input" read --inputs--; Col. 5, line 33, for "thrid" read --third--; Col. 6, line 63, for "4 to 8-bit instrustion" read --4 or 8-bit instruction--; Col. 9, line 26 read --As heretofore explained a 64-bit instruction word--; Col. 10, line 28, for "AND" read --and--; Col. 17, line 19, for "is" read --in--; Col. 17, line 21, for "in" read --is--; Col. 18, line 8, for "AND" read --and--; Col. 30, line 4, for "ech" read --each--; Col. 32, lines 59 and 60, delete "for applying the enable signals from said issue means and from said exchange means"; Col. 35, line 46, after "multiprocessor" read --computer--; Col. 38, line 26, for "firstnamed" read --first-named--; Col. 38, line 32, for "59" read --69--.

Signed and sealed this 14th day of January 1975.

(SEAL)
Attest:

McCOY M. GIBSON JR.
Attesting Officer

C. MARSHALL DANN
Commissioner of Patents